United States Patent [19]

Peck, Jr. et al.

[11] Patent Number: 4,987,834

[45] Date of Patent: Jan. 29, 1991

[54] ACCUMULATING CONVEYOR WITH SELF-PROPELLED PALLETS

[75] Inventors: Glenn L. Peck, Jr., Grand Blanc; James F. Foster, Lansing; Kenneth J. Pol, Saginaw, all of Mich.

[73] Assignee: Roberts Sinto Corporation, Lansing, Mich.

[21] Appl. No.: 370,141

[22] Filed: Jun. 20, 1989

Related U.S. Application Data

[63] Continuation of Ser. No. 227,490, Aug. 1, 1988, abandoned, which is a continuation of Ser. No. 922,497, Oct. 23, 1986, abandoned.

[51] Int. Cl.⁵ ............................................. B61J 3/12
[52] U.S. Cl. ................................... 104/300; 104/128; 104/250; 104/88; 246/187 B
[58] Field of Search ............................ 104/127–129, 104/287, 288, 295, 299–301, 27, 249, 250–252, 88; 246/167 D, 182 R, 186, 174, 184, 187 B, 187 R, 187 A; 198/341, 464.4, 460; 180/169

[56] References Cited

U.S. PATENT DOCUMENTS

| | | | |
|---|---|---|---|
| 1,704,342 | 3/1929 | Redpath et al. | 104/128 |
| 2,798,267 | 7/1957 | Anderson | 104/128 X |
| 3,169,733 | 2/1965 | Barrett, Jr. | 246/184 X |
| 3,365,572 | 1/1968 | Strauss | 246/167 D |
| 3,749,197 | 7/1973 | Deutsch | 180/169 |
| 3,823,673 | 7/1974 | Wesener | 104/288 X |
| 3,854,889 | 12/1974 | Lemelson | 29/33 P |
| 3,881,573 | 5/1975 | Cotter et al. | 104/127 X |
| 4,084,686 | 4/1978 | Calhoun | 198/464.4 |
| 4,095,666 | 6/1978 | Baba et al. | 180/169 |
| 4,301,899 | 11/1981 | McSparran et al. | 246/187 B X |
| 4,307,922 | 12/1981 | Rhodes, Jr. | 104/295 X |
| 4,345,662 | 8/1982 | Deplante | 180/169 X |
| 4,552,260 | 11/1985 | Teagno et al. | 198/345 |
| 4,554,873 | 11/1985 | Rex | 104/88 |

FOREIGN PATENT DOCUMENTS

| | | | |
|---|---|---|---|
| 0044457 | 3/1980 | Japan | 198/464.4 |
| 0203611 | 12/1982 | Japan | 198/464.4 |
| 0094941 | 6/1983 | Japan | 104/307 |

*Primary Examiner*—Dennis H. Pedder
*Assistant Examiner*—Joseph D. Pape
*Attorney, Agent, or Firm*—J. R. Benefiel; R. J. Eifler

[57] ABSTRACT

An accumulating conveyor formed by a series of self propelled pallets (18) running on a track (20), with noncontacting proximity detectors (24A, 24B) located on the front and rear of each pallet (18), and an on board control circuit (26) causing deenergization of the drive motor (22) when a stopped pallet (18) is detected ahead, or when barrier members (28, 30) are positioned ahead. Slow down, stopping and reversing of the drive may be controlled by side mounted photo detector switches (40A, 40B, 52A, 52B) activated by photo emitter devices (42A, 42B, 54A, 54B) mounted along the path of the pallets (18). A bilevel feed and return track (20A, 20B) may be traversed by the pallets (18), reversed to be driven in either direction, and either the forward or rear proximity switch (24A or 24B) activated by the control circuit (26) depending on the direction of travel of the car. Elevator mechanisms (48, 50) are located at either end of the bilevel track (20A, 20B) for raising and lowering the pallets (18) between levels.

14 Claims, 17 Drawing Sheets

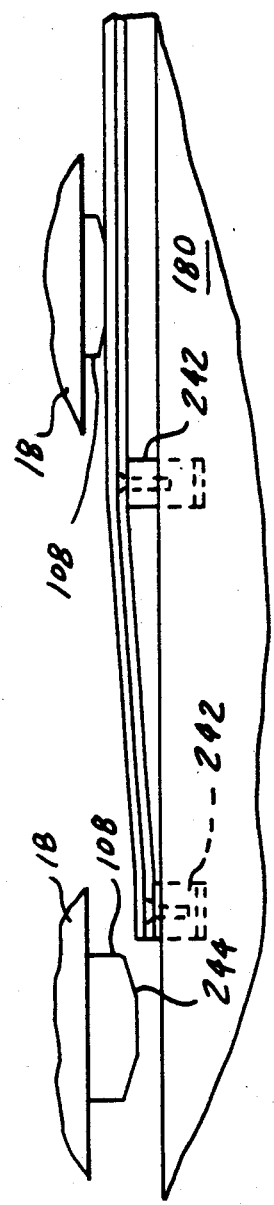
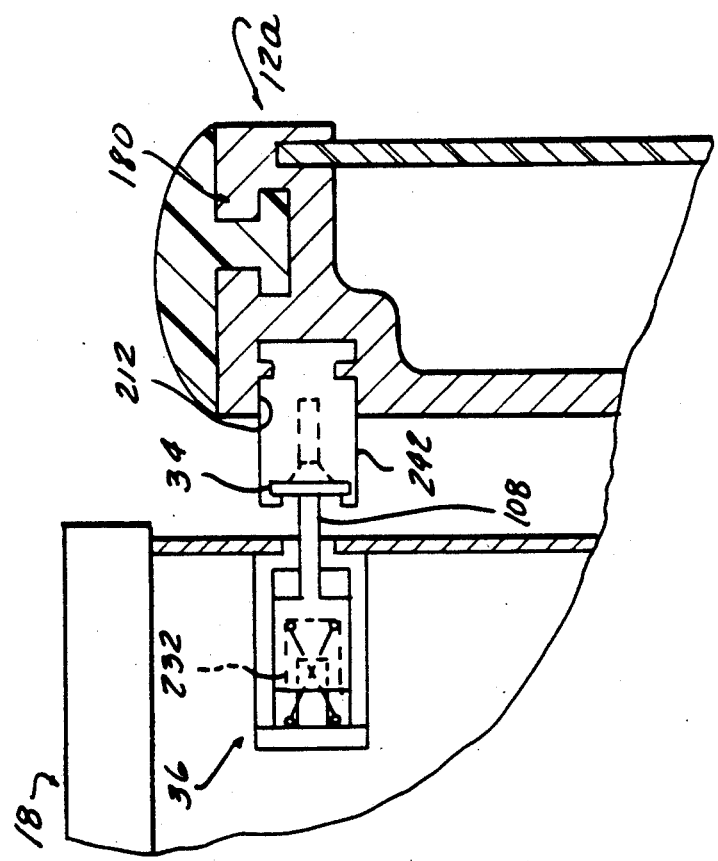
FIG-13
FIG-12

ACCUMULATING CONVEYOR WITH SELF-PROPELLED PALLETS

This application is a continuation of application Ser. No. 07/227,490, filed Aug. 1, 1988, now abandoned, which is a continuation of application Ser. No. 06/922,497, filed Oct. 23, 1986, now abandoned.

FIELD OF THE INVENTION

This invention concerns transfer devices for transferring a series of workpieces to and from one or more work stations in which an accumulation of workpieces upstream of each work station is enabled.

BACKGROUND DISCUSSION

Automatic transfer of workpieces between stations at which some operation is performed on the workpieces is common in many manufacturing industries. For example, such "automation" is often utilized in the auto industry to transfer crankshafts, engine blocks, and the like between machine tools performing machining operations on the workpiece. Conveyors are widely employed to transfer such workpieces during assembly and testing thereof.

Synchronous transfer devices such as shuttles and lift and carry devices have long been used in which a series of workpieces are each simultaneously advanced between stations in step-by-step fashion.

Nonsynchronous devices have also been employed in which the workpieces are each transferred independently of the movement of the other workpieces. Examples of these include power roller and "delmatic" conveyors. Arrangements a re known in which pa 1 lets are individually controlled to be clutched and declutched to a conveyor chain to establish independent advance of each pallet and allow accumulation of pallets upstream of each workstation. See U.S. Pat. No. Re 25,886 issued on Oct. 26, 1965 for a "MANUFACTURING SYSTEM USING FREE FLOATING FIXTURE LINE", to D.A. Cargill for an example of such accumulation of chain driven pallets upstream of each work station.

Accumulation is a desirable feature, particularly in systems where various machine tools are tied together in an integrated manufacturing system. By "accumulation" is meant the ability to allow a series of work pieces to wait in readiness upstream of a given work station to provide "float", avoiding interruption of production if the supply of workpieces is temporarily discontinued.

Synchronous transfer devices require complex mechanical, electrical or pneumatic control components to provide an accumulation capability.

An advantage of nonsynchronous conveyors is their ability to provide an accumulation feature without the need for such complex controls.

However, nonsynchronous accumulating conveyors which have herefor been provided have utilized drive systems which have been custom engineered for each application and which involve interrelated drive components such that mechanical failure of any of these components tends to result in complete shutdown in the conveyor system as a whole, with the resultant loss of production of the entire manufacturing system. Such mechanical conveyor systems have also typically involved the use of complex mechanical components.

There has heretofor been disclosed systems in which electrically driven work piece supporting carriers or pallets nonsynchronously transport workpieces to work stations whereat manufacturing or other operations are performed on the workpieces.

These arrangements, while eliminating the complex interrelated mechanical conveyors, do not provide for an accumulation of work carriers at a work station and in addition rely on complex centralized electrical controls for directing the work carriers or pallets to a particular station.

U.S. Pat. No. 3,854,889 issued Dec. 17, 1974, to Lemelson for "AUTOMATIC PRODUCTION MACHINERY", and U.S. Pat. No. 3,796,327, issued Mar. 12, 1974 to Meyer et al for "MANUFACTURING SYSTEM", disclose examples of such systems.

In the prior art palletized transfer systems there has typically been required complex locating and clamping mechanisms to accurately position the workpieces in the station to achieve the degree of accuracy necessary for performing the operation or further handling of the workpieces.

There have also been previously disclosed systems in which electrically driven cars, normally stored in a holding area, transport containers of small items to various remote stations, such as in a warehouse or processing plant. There has not been disclosed the use of such electrically driven cars in an accumulating conveyor system for sequential multistation manufacturing or other operations in which workpieces are fixturized accurately on the carrier to enable operations to be performed on the workpiece while mounted on the carrier.

U.S. Pat. No. 4,015,537 issued Apr. 5, 1977 to Graef et al for "INTERIOR RAILWAY TRANSPORTATION SYSTEM", and U.S. Pat. No. 4,056,063 issued Nov. 1, 1977, for a "DISPATCHER FOR CONVEYOR SYSTEM", issued to Ritter, are examples of such disclosed systems.

Graef et al, U.S. Pat. No. 4,015,537 discloses the use of bumper switches used for discontinuing drive of a car upon encountering obstruction. Such obstruction detection is not disclosed as utilized in the normal functioning of the system and also is described as preferably being arranged for both the front and rear of each car, which would render the system impractical for application to accumulating conveyor systems, particularly for manufacturing. The touching contact required to trigger the bumper switch and stop the car does not allow for sufficient positional accuracy of the car in the stopped position for many of the applications in automated handling of workpieces.

Each of the Graef et al and Ritter patents contemplates complex electrical controls for the directing of cars to a particular station.

It is important, particularly in manufacturing plants, that the simplest design possible be employed in such conveyor systems, since increased complexity adversely affects reliability of operation of the conveyor system, particularly in integrated manufacturing systems in which a large number of conveyors are employed in the same system. Productivity of the overall system would be adversely affected by a lack of reliability in any of the individual systems incorporated.

The aforementioned U.S. Pat. No. Re 25,886 also discloses a mechanical sensing of a next adjacent pallet, and declutching from a conveyor drive chain, as does U.S. Pat. No. 4,461,216 issued on July 24, 1984 to Carney for an "OVER AND UNDER ACCUMULATING POWER AND FREE CONVEYOR SYSTEM", and U.S. Pat. No. 4,338,864 issued on July 13, 1982 to Ziegenfus for an "ASSEMBLY LINE DRIVERLESS VEHICLE".

The aforementioned U.S. patent to Carney, U.S. Pat. No. 4,461,216 also discloses vertically spaced runs of an accumulating conveyor, allowing return of pallets beneath an upper run, with pusher dogs deactivated by sensing of another pallet ahead to enable accumulation in both directions.

The nature of the drive involves complex mechanical drive components.

U.S. Pat. No. 4,552,260 issued on Nov. 12, 1985 to Teagno et al for a "WORKPIECE FEEDING APPARATUS", describes an over and under synchronous transfer of pallets, with lift mechanisms at either end of the upper and lower conveyor runs, which arrangement also involves complex mechanical drive components.

SUMMARY OF THE INVENTION

The present invention comprises a nonsynchronous accumulating conveyor in which a series of pallets fixturizing one or more workpieces are self propelled along a track disposed between work stations whereat operations such as manufacturing or further handling i.e., automated loading and unloading of the workpieces are conducted.

Each of the pallets carries a simple, self contained, electrical control system with a minimum of interaction with the electrical controls of the conveyor system as a whole.

These controls comprise proximity sensing means, preferably a non contacting sensing means such as a photo electric switch, disposed at the leading end of each pallet carrier, which sensing means detects the approach of the pallet to the next adjacent pallet forward of each carrier, and causes the propelling drive of the carrier to be discontinued to bring the pallet to a stop.

On board control over the propulsion of each pallet is utilized to achieve an accumulation of work carriers upstream of each work station when an excess number of pallets are included in the system, such that queuing of a supply of workpieces upstream of each work station results, each pallet moving up automatically as the next ahead pallet moves forward.

The non-contacting switches also provide a simplified control over the propelling of each pallet into a work station, by controllably positioning one or more movable barrier members at each station. The presence of the barrier member provides a readiness control, allowing entry of the next pallet only when the readiness barrier member is positioned out of the path of the next pallet, and the station is ready to accept the next pallet.

The readiness barrier members function as fail safe stops to restrain propulsion of a given pallet past the barrier in the event the electrical control fails. An alarm may be incorporated responsive to malfunction and cessation of pallet movement for a predetermined time period to provide a visual or audible indication of the failed electrical controls.

According to another aspect of the present invention, the pallets are propelled by drive motors carried on the pallets which are powered by a battery carried on each pallet, and which battery is recharged during the queuing interval of the cycle of operation, by means of charging conductor bars positioned on either side of the conveyor track immediately upstream of one or more of the work stations. The conductor bars are engaged by spring loaded contacts carried on each pallet with the conductors being connected to a suitable charging electrical power source, such that the waiting interval prior to entry into a station is employed to maintain the batteries in a fully charged condition.

In a preferred embodiment of the invention, the conveyor system is utilized for transporting workpieces between load and unload stations at either end of the conveyor system.

In this system, a feed and return track arrangement is incorporated, in which a feed main track is spaced from a second or return main track. For vertically spaced feed and return tracks, an elevator mechanism is provided at both the load and unload stations at either end of the conveyor system. In such system, each of the pallet carriers is provided with a "forward" and "rearward" proximity sensor device, and the pallet drive motor is reversed to drive the pallet in a reverse direction along either of the vertically spaced tracks, with the forward and rearward sensors only activated when the pallet is driven in the respective directions.

The invention has the advantage of greater reliability and easier maintenance than conventional mechanically driven accumulating conveyors since each of the pallets is self contained and able to be lifted out of the system for maintenance or for other purposes without any effect on the operation of the conveyor system as a whole.

The invention also may be lower in cost and is easily reworked into different configuration since the conveyor system requires only standardized straight and curved track sections, which may be repositioned to reconfigure the conveyor system as required in order to be adapted to changed requirements.

BRIEF DESCRIPTION OF THE DRAWINGS

FIG. 12 is a fragmentary view of the pallet showing adjacent track sections illustrating the engagement of a wiper contact with a conductor bar during charging of the power battery incorporated in the pallet of FIGS. 3–8.

FIG. 13 is a view of a section of track with the conductor bar installed thereon and illustrating the engagement action occurring as a pallet advances to cause engagement of the spring loaded contacts with the charging conductor bar.

DESCRIPTION OF THE PREFERRED EMBODIMENTS

Figure 1:
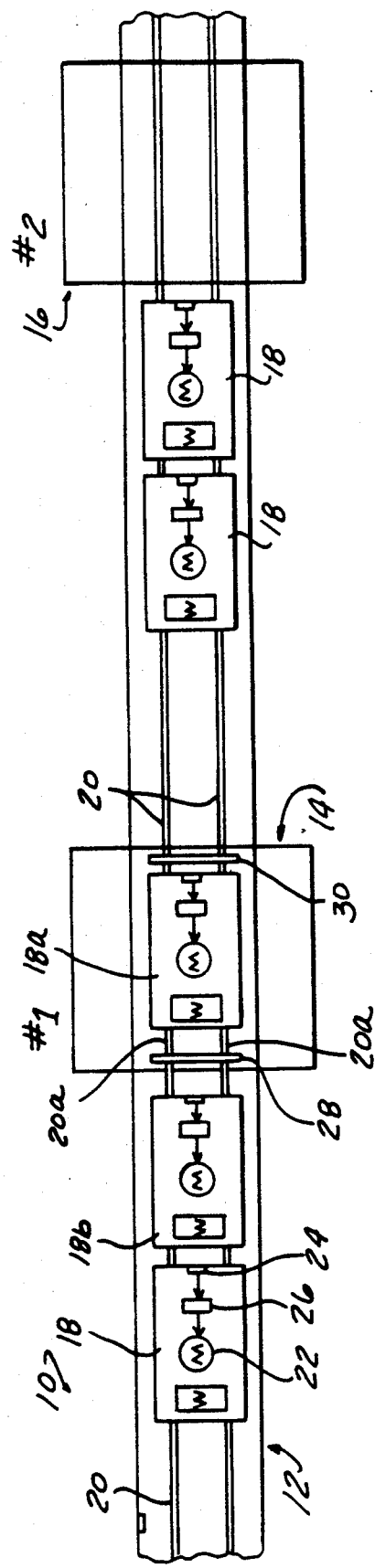
FIG. 1 is a fragmentary diagrammatic plan view of a conveyor according to the present invention.

FIG. 1 depicts the basic operating concept of the nonsynchronous accumulating conveyor 10 according to the concept of the present invention which includes a conveyor structure 12 extending successively to a first station 14 and then in sequence to a second station 16, with operations performed on workpieces at each station 14 and 16.

The workpieces (W) are mounted to be fixturized and carried on a series of self-propelled pallets 18 which are positioned on a upper or lower track 20 included in the conveyor structure 12 extending along the length thereof.

The propulsion of the pallets 18 along the tracks is accomplished by means of an electric drive motor 22 carried by each pallet 18. The motor 22 when energized causes drive of a drive element such as a roller or wheel (not shown) supporting the pallet 18 on the track 20.

The energization of the motor 22 and the consequent propulsion of the self propelled pallet 18 is controlled by means of a proximity sensor device 24 such as a photoelectric non-contacting switch which detects the proximity of a structure immediately ahead of the pallet 18 in the direction of propulsion, causing a de-energization of the propelling motor 22. Upon sensing the approach to forwardly positioned object, such as the next forwardly adjacent pallet 18 on the track 20, a proximity sensor 24, acting through an onboard control circuit 26, acts to de-energize the motor 22, quickly bringing the pallet 18 to a stop, with dynamic braking or internal friction of the motor 22 or gearing aiding in this process.

According to one aspect of the present invention, an excess number of pallets 18 are utilized over the number of stations, so that a stackup or accumulation of pallets 18 ahead of each station 14 and 16, is provided, with the pallets 18 queuing one behind the other upon sensing the presence of the next adjacent pallet in the series.

According to another aspect of the present invention, the proximity sensor device 24 is utilized to control the entry of each pallet successively into a station 14 and 16 and also may be utilized to approximate the positioning of each pallet 18 within the station 14 or 16.

This is accomplished by the embodiment shown in FIG. 1, in which a "readiness" barrier member 28 is provided movably positioned at the entrance of station 14, whenever the station 1 is for some reason not prepared to accept a next succeeding pallet 18a, as due to the presence of another pallet 18b in the station.

That is, if a station is in a state of unreadiness, the readiness barrier member 28 is moved into position in the path of the pallets 18, which causes the first pallet 18b just ahead of station 14 to cease to be propelled, and come to rest at a location just upstream of the station 14 as shown, by sensing of the readiness barrier member 28 by the respective proximity sensor device 24.

Upon removal of the barrier member 28 out of the path of the next pallet 18b, the pallet 18b is again begun to be propelled by energization of the drive motor 22 such as to move into the station 14 on tracks 28 located within the station 14.

The pallet 18a shown within station 14 was brought to rest in the proper location within the station 14 by means of a "locator" barrier member 30 positioned in the path of the pallet 18b. Upon sensing of the locator barrier member 30, the drive motor 22 is again de-energized and the pallet 18 brought to rest in the proper location within the station 14.

Upon completion of operations in station 14 on the workpiece W, the pallet 18 is again energized so as to be propelled out of the station 14 onto the parallel tracks 20 to proceed to the next station 16. Again, a sufficient number of pallets 18 are provided in the system such that a queuing is likewise formed upstream of the number 2 station 16, to thereby provide a "float" in the system. That is, to provide an accumulating effect, since each car will successively move into the station with the cars to the rear moving up as the next adjacent forwardly located pallet 18 moves away therefrom to allow re-energization of each of their respective propulsion drive motor 22.

It can be seen that this relatively simple control system does not require substantial interreaction between the pallets 18 and the remaining elements of the conveyor system 10 with only the movable barrier members 28 and 30 required to achieve a nonsynchronous accumulating conveyor. Any malfunction in the individual pallets 18 or removal of an individual pallet for repair or maintenance will not affect the operation of the conveyor system 10 as a whole.

Figure 1A:
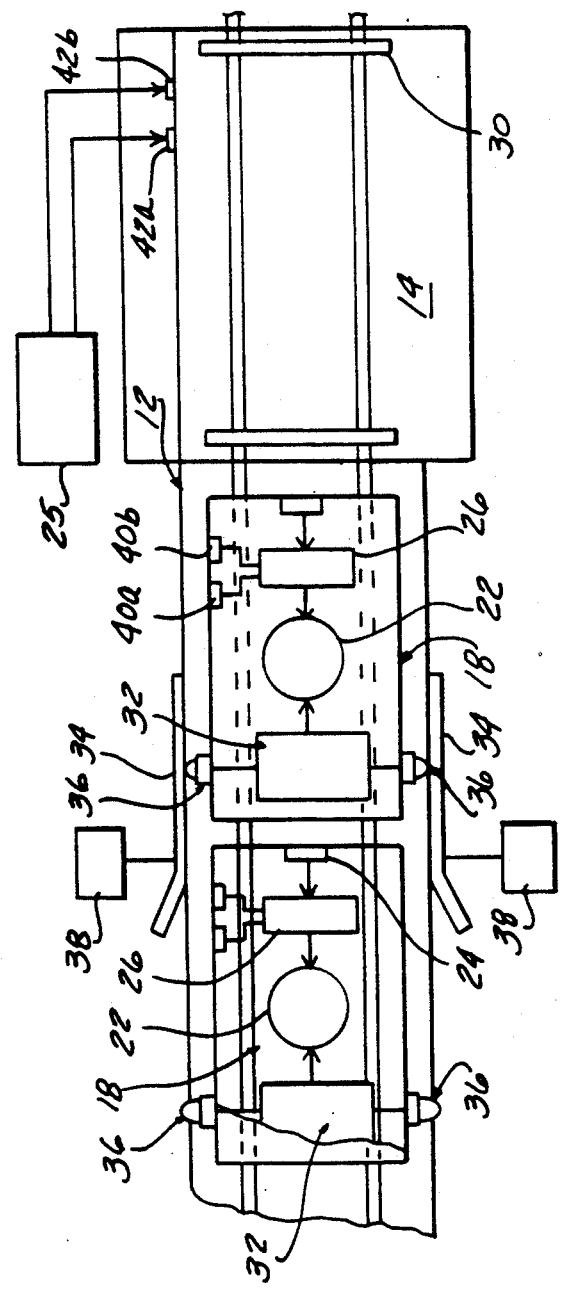
FIGURE 1A shows a diagrammatic representation of an alternate form of the pallet incorporated in the conveyor system of FIG. 1.

FIG. 1A shows further details of the pallets 18 according to the preferred embodiment in which the drive motor 22 is driven by an onboard power source comprised of a rechargable battery 32.

According to another aspect of the present invention, the rechargable battery 32 of each pallet 18 is charged while the pallet 18 is queued in line ahead of one or more of the stations 14 or 16 such that the delay interval inherent in the accumulating mode may be utilized to maintain the rechargable battery 32 in a fully charged condition such as to avoid any need for special handling of the pallets in the conveyor system to accomplish recharging of a batteries 32.

Conductor charging bars 34 are positioned immediately upstream of the station 14 and spring loaded contacts 36 are carried on either side of the pallet 18 which move into engagement with the conductor strip 34 as the particular pallet 18 is propelled into the region immediately upstream of the station 14. A charging electrical power source 38 of appropriate polarity is associated with each conductor bar 34.

While the control of each self propelled pallet 18 may in some cases be accomplished entirely by means of the proximity sensor devices 24, an electrical control is also contemplated in which a pair of photo electric switches 40a and 40b are mounted on the side of each pallet 18, with corresponding pairs of photo emitting devices 42a and 42b positioned on the conveyor structure 12 to come into registry with a respective photoelectric switch 40a or 40b at locations whereat it is desired to bring the pallet 18 to a stop. This control is preferred over the use of a locator barrier member 30 where differences in reflectivity between the locator barrier members 30 and pallets 18 are likely to occur due to accumulations of dirt, as is likely in typical factory environment.

The on-board pallet controls 26 react to excitation of the photo electric switches 40a, 40b to cause the drive motor 22 to be de-energized and bring the particular pallet 18 to a stop.

Excitation of the first emitter device 42a through the agency of the machine control system 25, and consequent triggering of photo electric switch 40a causes motor 22 to be operated at slow speed, to in turn cause the pallet 18 to approach the stop location at a greatly reduced speed. Thus, when moving into registry with the second photo emitter 42b and triggering of the second photo electric switch 40b, to cause the motor 22 to be stopped, the pallet 18 is moving at a much slower speed and able to respond more reliably and brought to a stop in an accurately and controlled position.

While the present invention has application to integrated manufacturing systems in which the stations are located along the conveyor system while performing machining, assembly, testing or other operations, the present conveyor system can also be utilized where workpieces are transported between load and unload stations where other work handling devices are employed to move workpieces into machine tools or other manufacturing apparatus. The conveyor system 10 is in this instance employed purely for transport of the work pieces between the load and unload locations and interaction with hand ling of robots or other workhandling devices.

Figure 2:
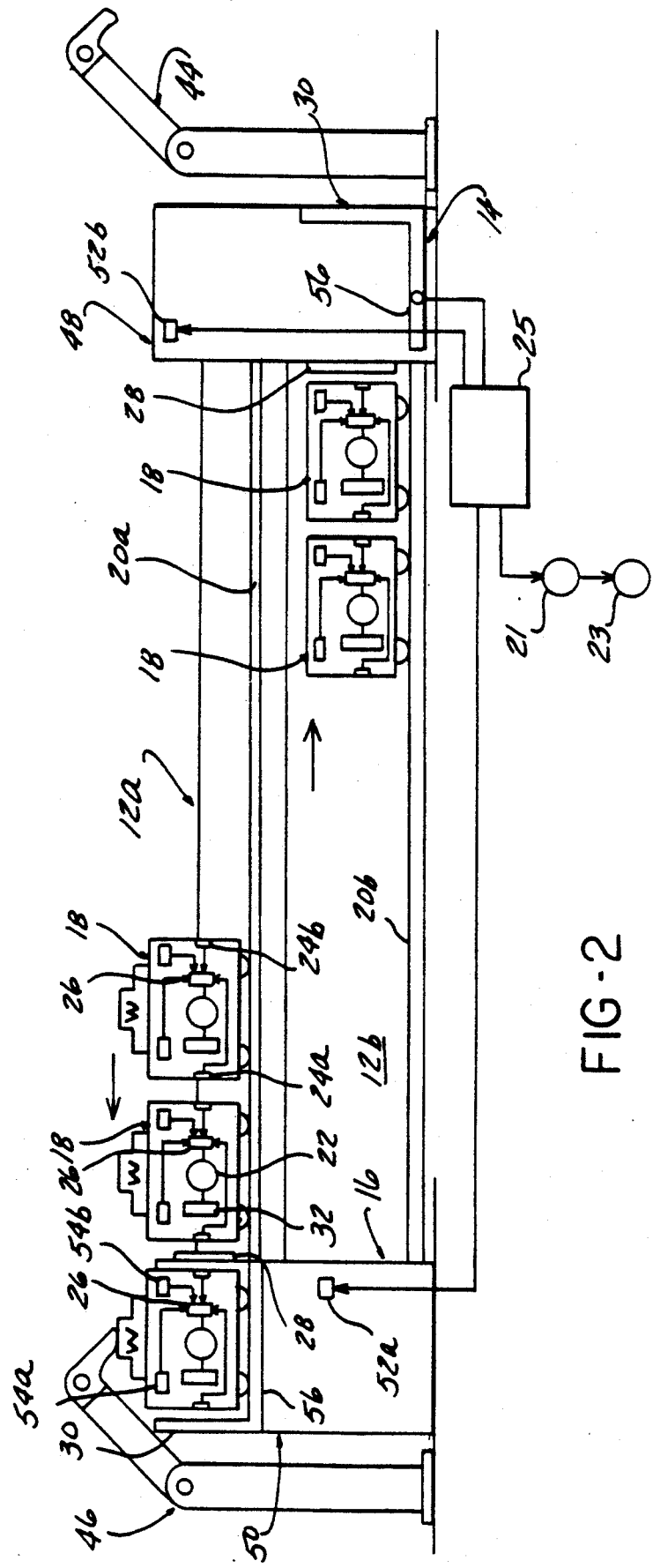
FIG. 2 is a diagrammatic side elevational view of a particular application of the conveyor system according to the present invention to loading and unloading of workpieces at spaced stations.

FIG. 2 illustrates such an application diagrammatically in which the first station 14 is a load station whereat a loading mechanism such as a robot 44 acts to load workpieces onto the pallets 18, which are then propelled down an upper track 20a to an unload station 16 where a second unloader, robot 46, removes workpieces (W) from the pallets 18.

According to one aspect of the present invention, a lower return track 20b is provided with a lift-lower mechanism 48 provided in load station 14. A lift-lower mechanism 50 is also provided at the unload station 16.

In this embodiment, the pallets 18 are driven alternatively in opposite directions and therefore are provided with a pair of non-contacting switches 24a each located at either end of the pallet 18, which alternatively cause de-energization of the motor 22 upon approach of either end of the pallet 18 to a structure in the path of the pallet 18 when being propelled so as to position the particular switch 24a or 24b at the leading end of the pallet 18.

The electric motor 22 of each pallet 18 in this embodiment is reversible to produce propulsion of the pallet 18 in opposite directions. Thus, the pallets 18 are each able to be driven in one direction on the upper track 20a, and in another direction on the lower track 20b, after being lowered in the same orientation to the track 20b by means of lift-lower mechanism 50.

Emitter devices 52a and 52b are provided, one at each station 14 and 16, activated by the machine controls which activate photo electric switches 54a or 54b respectively on the side of each pallet 18. Upon excitation of either photo electric switch 54a or 54b, the onboard pallet control circuit 26 causes reversal of the electric propulsion motor 22 to be energized in either the forward or rear direction, to propel each pallet 18 out of either the lift-lower mechanism 48 or 50 and to proceed out from either station 14 or 16 in the reverse direction from which it entered that station.

Auxiliary rails 56 of each of the lift-lower mechanisms 48 and 50 receive each pallet 18 successively, entry thereon being controlled by a movable readiness barrier member 28, moved into position only upon proper positioning of a rails 56 with either upper track 20a or lower track 20b respectively.

Slow speed and stop photoelectric switches 40a and 40b, and associated photo emitter devices 42a, 42b (not shown in FIG. 2) also controlled by the machine controls 25, are contemplated as bringing each pallet 18 to a stop at the proper location on the auxiliary rails 56.

Also provided in each lift-lower mechanism is a safety barrier member 30, which may be attached to the auxiliary rails 56, creating a physical barrier to prevent propulsion of the pallets 18 out of the station in the event the controls fail.

Thus, with the readiness barrier 28 out of position, the particular pallet 18 is driven onto the auxiliary track 56 and is continued to be driven until switches 40a and 40b moving into registry with photo emitter 42a or 42b at which time the drive motor 22 is slowed and then de-energized to bring the pallet 18 to a stop on the auxiliary rails 56. The rails 56 are then elevated by a suitable mechanism, such as a pneumatic cylinder to be described, to raise the pallet 18 so that the auxiliary rails 56 are brought to the level of the upper track 20a.

After moving to this raised position, photo emitter device 52b moves into alignment with a forward photo electric switch 54b (as does switch 40b and emitter device 42b, not shown). When the loading operation is complete, the machine controls 25 cause energization of emitter devices 42b and 52b, causing energization and reversal of the drive motor 22, the pallet 18 is immediately propelled off of the auxiliary rail 56 and onto the upper track 20a, and to proceed down to the unload station 16 after completion of the unload operation lowering of the auxiliary rails 56.

It is understood that such loading robots 44 and 46 are normally controlled by a machine control 25 to seek a part at a precise location in the respective station.

If, due to malfunction of the on-board circuit 26 or the sensor devices (or emitters) a pallet moves uncontrolled into a station 14 or 16 it will not be so positioned.

The robots 44 or 46, not finding a part at the proper location are typically simply shut down by the machine controls 25.

This condition may trigger an alarm 23 by incorporating a timer 21, which is triggered after a predetermined period when no further movement of pallets 18 occurs due to the shut down of a robot 44 or 46. This will alert an operator of a malfunction in the conveyor system 10.

Again, the number of pallets 18 provided is sufficiently greater than the number of stations, such that accumulation is achieved by the queuing up of a number of pallets 18 upstream of each station 14, 16.

Figure 3:
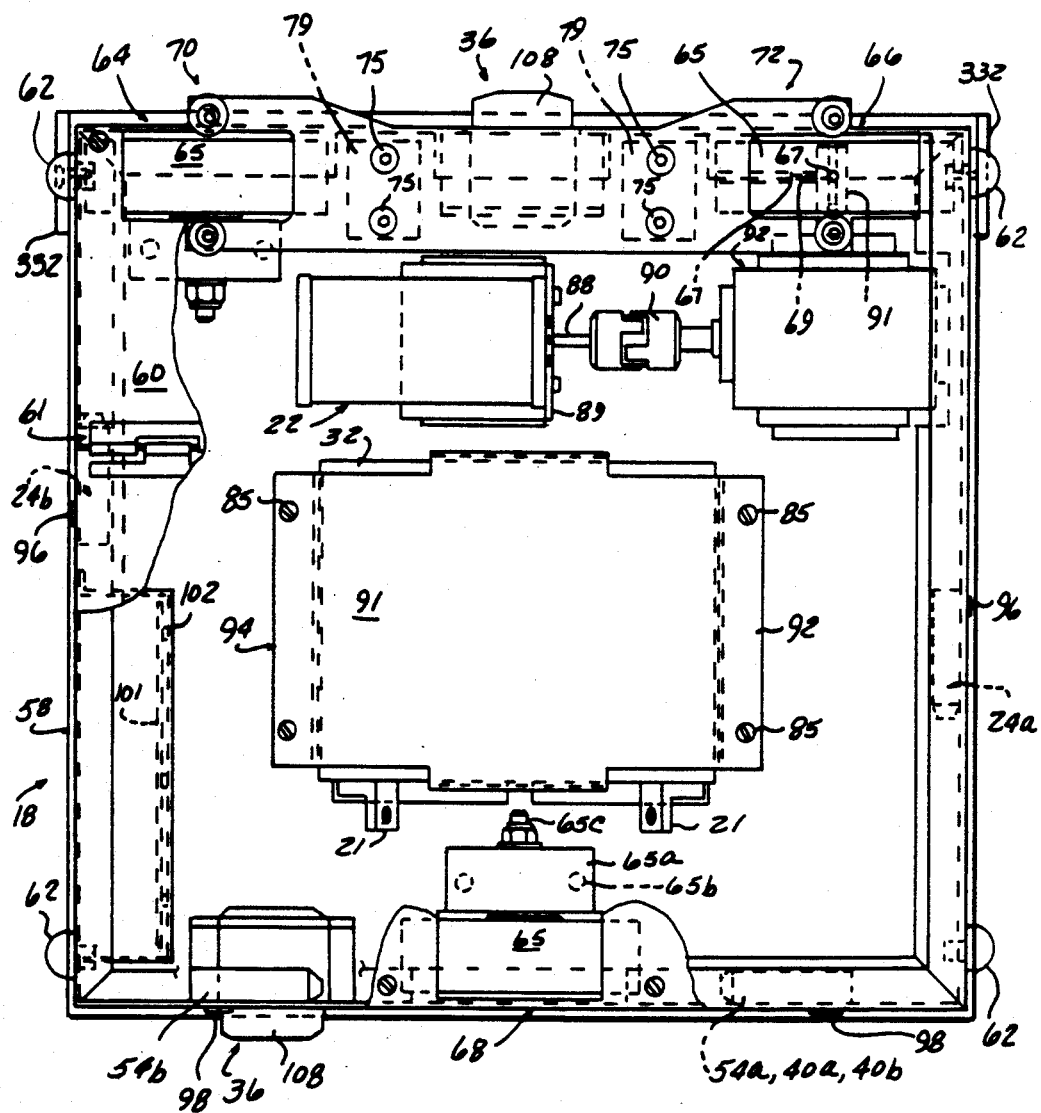
FIG. 3 is a bottom view of a self propelled pallet utilized in the conveyor system according to the present invention.

FIG. 3 depicts the details of a pallet 18 according to the present invention, which includes a sheet metal housing 58 defining a substantially rectangular box, for housing the components of the pallet 18. A bottom plate 60 is shown in fragmentary form, provided to insure protection of the internal components from the environment, with a section thereof hinged at 61 to allow convenient access to the interior thereof.

Rubber bumpers 62 may be provided on the ends of the pallet 18 to reduce the force of contact in the event of accidental impacting of the pallets 18.

Each pallet 18 carries hardened steel roller wheel assemblies 64 and 66 spaced apart on one side of the pallet 18 and a third roller assembly 68 centered therebetween on the opposite side.

Edge guiding roller assemblies 70 and 72 are provided adjacent roller assemblies 64 and 66 having opposing pairs of roller elements 71 mounted onto yoke member 78 adapted to engage either edge of the spaced parallel members forming the tracks 20 (not shown in FIG. 3).

The roller 65 included in roller assembly 64 is adapted to be driven so as to cause the propulsion of the pallet 18 by means of the electric drive motor 22, also mounted within housing 58 by bracket 89. Drive motor 22 preferably is of a reversible DC type, having an output shaft 88 connected by a coupling 90 to a gear reduction-right angle drive unit 92 having a drive output shaft 91 connected to rotate the roller 65 of roller assembly 64 by set screws 67 received in threaded bores 69 of roller 65. The roller 65 is thereby driven by motor 22 at a greatly reduced rate of rotation, a 30:1 reduction for a typical application.

Suitable reversible DC motors, couplings and gear reducer-right angle drive units are commercially available, and accordingly a detailed description is not here set forth.

Mounted in a sheet metal 1 housing 94 is a rechargable battery 32 adapted to provide power for the electrical drive motor 22, with terminals 21 allowing connection to the control circuit 26. Preferably, such battery is of the so called "gel cell" configuration commercially available under the tradename "Globe Gel Cell Battery", Model no. U-128-HD, 12V, in order to allow hoisting and handling of the pallets 18 in various attitudes without danger of spilling the electrolyte solution from within the battery 32.

Fore and aft proximity sensors are provided comprised of a forward non-contacting photoelectric switch 24a, of a type commercially available, providing for opening of normally closed contacts upon receiving a predetermined level of diffuse reflectance of an emitted beam from an adjacent surface. A window 96 protrudes from the pallet housing 58 to enable receiving of reflected light by beam switch 24a. Such reflectance photoelectric switches are commercially available, for example the Cutler Hammer Diffuse Reflective Beam Switch Model No. E 65 VNL 2.

Similarly a rear non-contacting proximity switch 24b is provided, which may also be comprised of a diffuse reflectance beam switch of the type utilized on the forward end of the pallet 18, receiving reflected emmissions through a protruding window 96 on the rear side of the housing 58. Switches 24a and 24b have normally closed contacts which will be opened upon approach of the pallet within a predetermined distance, in the series as described above.

Mounted on one side of the pallet housing 58 is a vertically aligned series of photoelectric receiver switches, 54a, 40a, 40b, while on the same side but spaced at the other end of the pallet 18 is the other reversing switch 54b. A protruding window 98 is exposed on each to enable reception of a beam from emitter devices 42a, 42b, 52a, 52b as shown in FIG. 2. These switches may be provided by Cutler Hammer Beam Receivers Model No. E6SVNL3.

Other proximity sensor devices, such as reed switches may be used where design criteria allow the operating characteristics of such components to satisfy the requirements of a particular application, but the optical switches are preferred for this application.

The components of the on board pallet control circuit 26 are mounted on a circuit board 101, protected within a cover 102, which control circuit 26 includes miniature relays electrically connected to forward and rear proximity switches 24a and 24b, as well as to slowing, reversing and stopping photo electric switches 54a, 54b, 42a, 42b to control the drive motor 22.

A pair of contact assemblies 36 is also depicted in FIG. 3, mounted to the lower left hand corner of the pallet housing unit 18 as viewed in FIG. 3. The contact 108 protrudes sufficiently to cause engagement with a respective conductive bar 34 to occur as the pallet 18 moves alongside, as will be described hereinafter.

A pair of hardened steel locator plates 332 are affixed to each end of the housing 58 on the top side as viewed in FIG. 3, cooperating with a mechanical clamping mechanism as will be described hereinafter.

Figure 4:
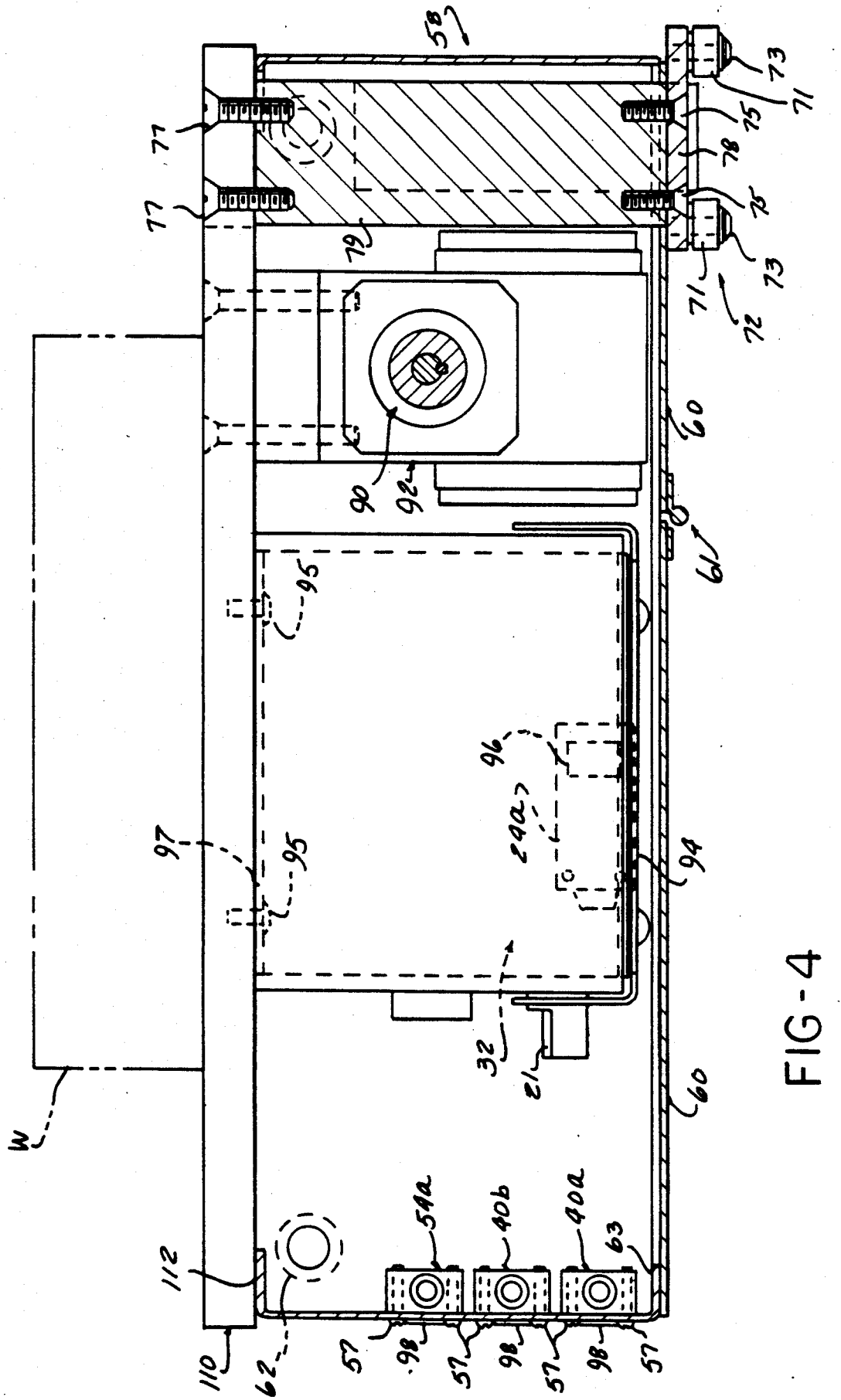
FIG. 4 is a view of the section 4—4 taken through the propelled pallet shown in FIG. 3.

FIG. 4 illustrates that the pallet housing 58 has an aluminum plate 110, positioned atop a flange portion 112 of the housing 58. Fixturing (not shown) locates and mounts a workpiece (W) on the upper surface thereof.

The bottom cover plate 60 is positioned against a bottom flange 63 of housing 58. The switches 40a, 40b, 54a are vertically aligned and fastened with screws 57 passing through the housing 58. The other switches 24a, 24b, 54b are similarly mounted.

The battery housing 94 is attached to the underside of fixture plate 110 with screws 95 passing through a cover flange 97.

Edge roller assembly 72 includes a pair of opposed rollers 71 rotatably mounted on pins 73 received in yoke member 78. Yoke member 78 is secured to a block 79 with screws 75, block 79 in turn secured to top plate 110 with screws 77.

Figure 5:
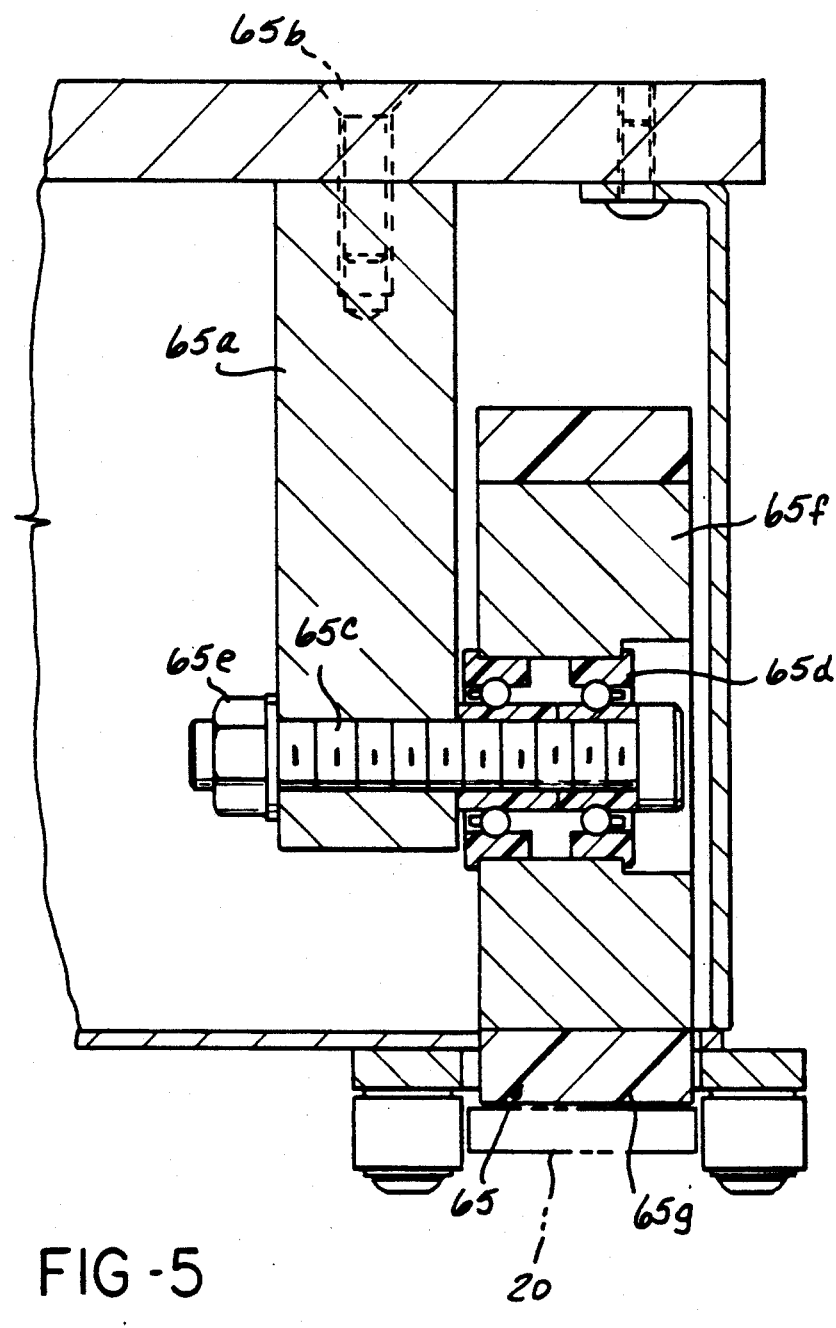
FIG. 5 is a view of the section 5—5 taken through the pallet shown in FIG. 3.

FIG. 5 illustrates the mounting of each roller 65 in roller assemblies 64, 66, 68 onto a roller pedestal 65a, in turn mounted to the underside of plate 110 with screws 65b.

An axle bolt 65c passes through a hub ball bearing 65d and pedestal 65a to rotatably support the roller 65 thereon, with a nut 65e returning the same.

Each roller 65 is comprised of a polyurethane wheel 65 pressed onto aluminum rims 65f. This provides for low wear running contact on tracks 20, and the resilient nature of the polyurethane accommodates chips and other debris on the tracks 20.

Each of the rollers 65 of roller assemblies 64, 66, 68 run on the upper surface 114 of the tracks 20, while the side guiding roller pairs 71 straddle the edges to provide a mechanical guiding of the pallet 18 on the tracks 20 for accurate location side-to-side of the pallet 18 along the length of the conveyor structure 12.

Figure 6:
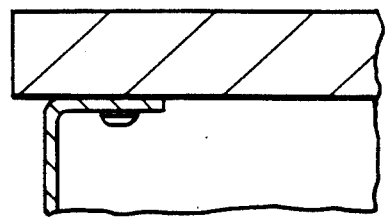
FIG. 6 is a view of the section 6—6 taken through the pallet shown in FIG. 3.

FIG. 6 illustrates the fastening of the fixture plate 110 to flanges 112 with screws 113; and the mounted bottom cover plate 60 to flange 63 with screw fasteners 115 received in threaded receptacles 117 of a well known type.

Figure 7:
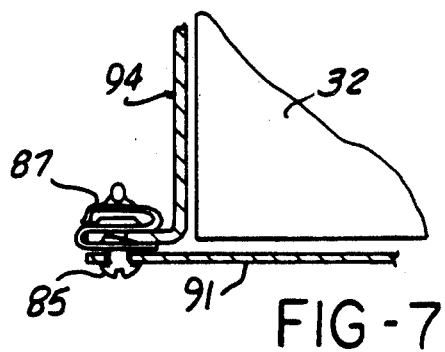
FIG. 7 is a view of the section 7—7 taken through the pallet shown in FIG. 3.

FIG. 7 shows the securing of battery cover 91 included in battery housing 94 with screws 85 received in receptacles 87.

Figure 8:
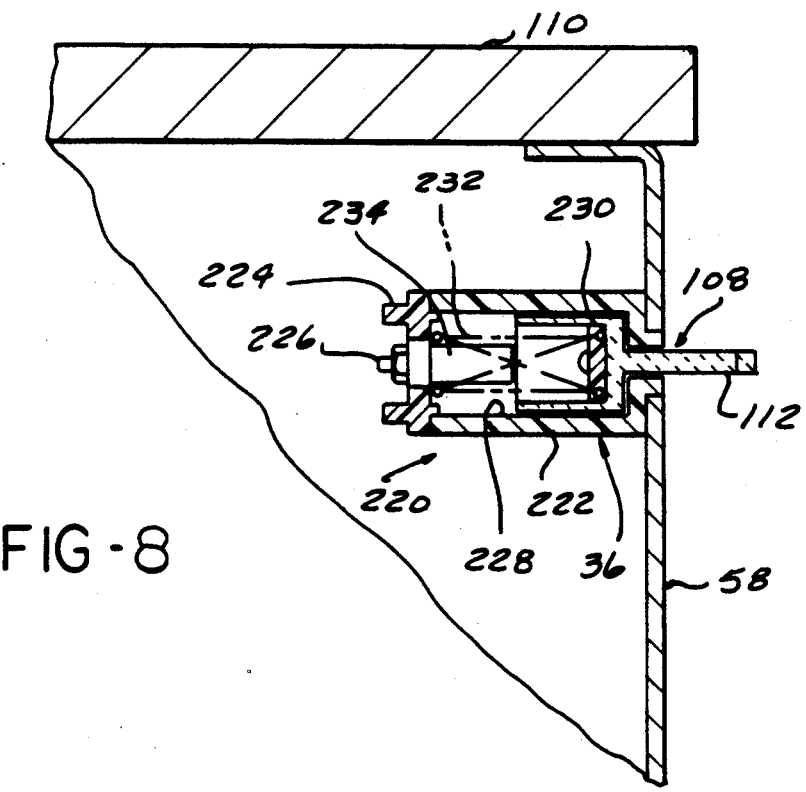
FIG. 8 is a view of the section 8—8 taken through the pallet shown in FIG. 3.

FIG. 8 illustrates details of the spring loaded contact assembly 36 which include a housing 220 comprised of a molded plastic box 222, and a bottom cover 224, secured together against a side wall of the housing 58 of pallet 18 by means of a nut and bolt assembly 226. The housing 220 defines a cavity 228 in which is disposed the spring loaded contact 108 having a protruding chamfered end blade portion 112 and a spring engagement socket 230 at the rear face thereof activated by a compression spring 232 received over a respective guide post 234 pressed into end cap 224. A suitable electrical lead (not shown) provides a connection to the battery 32.

Figure 9:
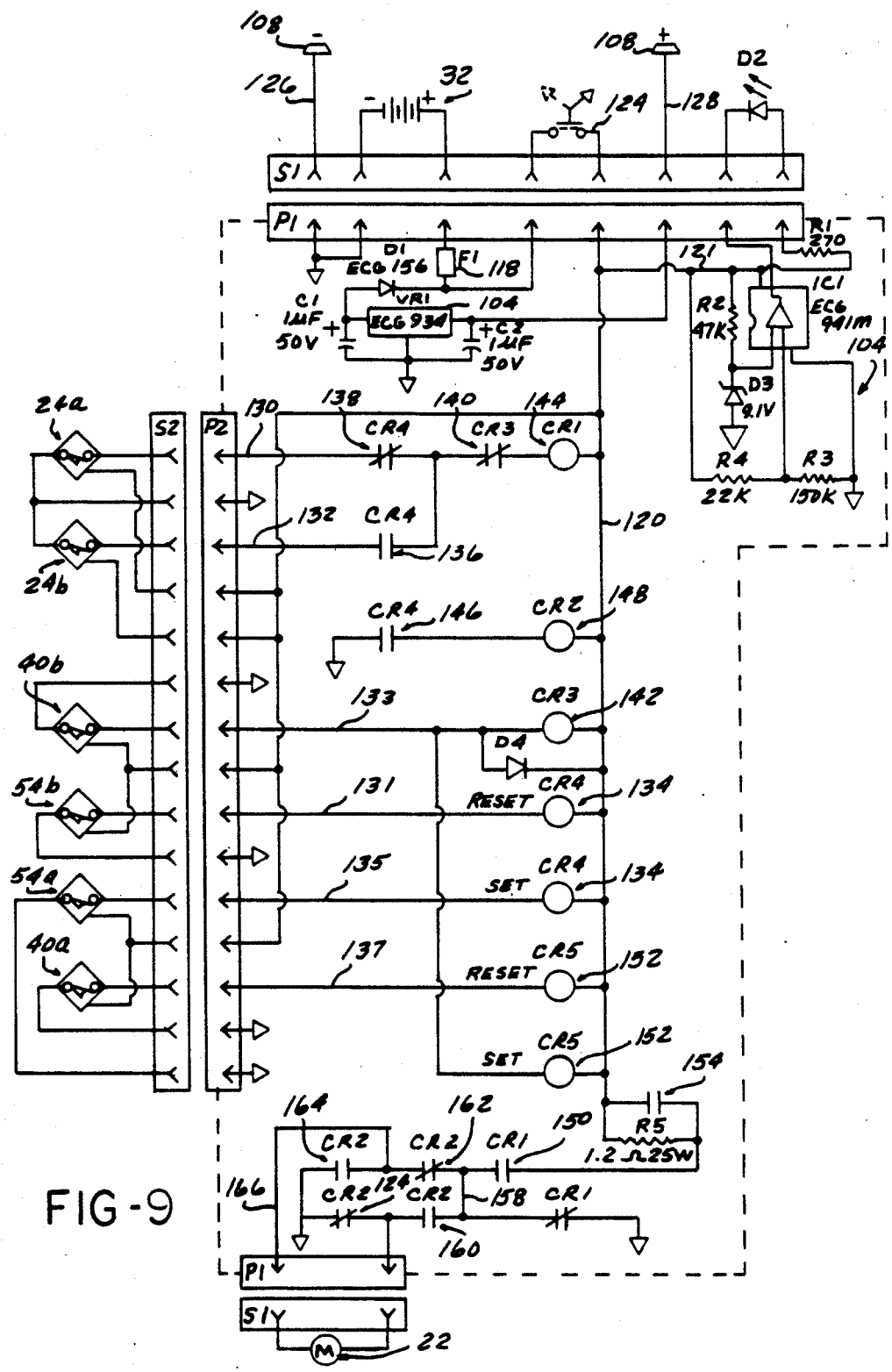
FIG. 9 is a schematic diagram of the on-board electrical control system incorporated in the self propelled pallet shown in FIGS. 3 and 4.

FIG. 9 is an electrical schematic diagram of the typical electrical control circuit 26 included in each pallet 18.

The rechargable battery 32 as previously indicated, is preferably of a "gel cell" design, 12 volts DC, and has the negative terminal connected to ground, and the positive terminal to fuse F1, via lead 118 with an on-off main switch 122 disposed in line 124, to control application of battery voltage to the main line 120.

The battery 32 is adapted to be recharged via lines 126 and 128 connected to contacts 108, in turn connected to an 18 v dc voltage source (not shown). A commercially available voltage regulator chip VR1 104 also is connected such as to control the voltage applied to charge the battery 32 with an applied voltage of capacitive filters C1 ADC 2 preventing spikes and diode D1 preventing shorting of the contacts 108.

A suitable chip 104 is model ECG934, IC-POS VR, 3 Terminal 13-8 V, SAMP.

A "low battery" LED D2 is included to detect a low voltage condition of the battery which is preferably mounted externally of the housing 58 to provide a visual indication of the condition.

LED D2 is activated by a bridge circuit 104, connected via lead 121 to main line 120.

Bridge circuit 104 is of a well known design including resistors R2, R3, R4 and operational amplifier IC1 so as to trigger LED D2 when a low (10 volt) level is detected, causing a triggering current to fire LED D2 via current limiting resistor R1.

The forward and rear non contacting switches 24a and 24b have their contacts connected by socket 52 and pin 52 to lines 130 and 132, and are normally closed as shown until a reflected photo signal received from adjacent structures reaches an intensity level such as to cause the switch contacts to open, this denergizes the drive motor 22 depending on which of the non contacting switches 24a or 24b is operatively effective in the control circuit 26. This result is controlled by normally open contacts 136 of a latching relay CR4, 134, closed by activation of photo switch 54a, placing the branch line 132 into the circuit, opening the contacts 138 to remove the proximity sensor device 24b from the circuit. Latching relay CR4 134 is latched by energization of a photo switch 54a located at the elevated position of the elevator 50 in the embodiment shown in FIG. 2.

Normally closed contacts 140 of relay CR3 142 allow energization of relay CR1 144, unless the normally open photoelectric switch 40b is closed by energization of the photo switch 54b. With energization of photo switch 54a and latching of CR4 134, contacts 136 are closed to energize relay CR1 144. At the same time contacts 146 of latching relay CR4 134 are closed to energize relay CR2 148. When relay CR1 144 is energized, normally open contacts 150 are closed. If the latching relay CR5 152 is unlatched, i.e., in the absence of activation of photoelectric switch 40a, the contacts 154 of relay CR5 152 are closed, such that branch line 156 is placed into the circuit, and since contacts 150 of CR1 144 are closed, branch line 158 is placed in the circuit. Since relay CR2 148 is energized, normally open contacts 160 thereof are closed to apply voltage to one side of the drive motor 22. Normally closed contacts of CR2 162 are opened upon activation of relay CR2 148. Normally open contacts 164 of relay CR2 148 are closed by the activation thereof such that the opposite side of drive motor 22 is connected via line 166 to thus energize the motor 22 and cause it to propel the pallet 18 in the forward direction.

Upon sensing of the approach to a next adjacent pallet 18, the non contacting switch 24a opens, opening the circuit across line 130 and thereby de-energizing drive motor 22.

When the reversing photoelectric switch 54b is energized, the latching relay CR4 134 is unlatched via line 131 such that normally closed contacts 138 thereof are again closed, placing the reverse non-contacting switch 24b into the circuit, opening contacts 136 to remove the forward non contacting switch 24a from the circuit.

Closing of the photoelectric switch 54b also reverses the direction of rotation of the drive motor 22, by the unlatching of latching relay CR4 144. The normally open contacts 146 of relay CR4 134 are opened such that relay CR2 148 is de-energized, and thus normally closed contacts 162 of CR2 148 are closed, such that voltage is applied across branch line 166 to the opposite side of the motor 22.

Relay contacts 174 of relay CR2 148 are closed to connect circuit ground to the other side of drive motor 22 such as to reverse polarity of the applied voltage to the drive motor 22, to reverse the drive of the pallet 18.

Contacts 160 of CR2 148 are opened as are contacts 162 of CR2 148 to complete the reversal of polarity of the voltage applied to the drive motor 22.

Upon approaching a pallet 18 in the reverse direction the reverse noncontacting switch 24b opens to de-energize relay CR1 144 and interrupt drive of the motor 22 as in the forward direction.

Excitation of normally open photoelectric switch 40b energizes relay CR3 142 via line 133 and also unlatches latching relay CR5 152. This opens contacts 154 of Cr 5 152 and closes contacts 176. Energizing relay CR3 142 causes de-energization of relay CR1 144, opening contacts 150 thereof to de-energize motor 22.

In the arrangement where a slow speed is initiated and photoelectric switch 40a is energized, latching relay CR5 152 is unlatched via line 137, opening contact set 154 and closing contacts 156, placing a resistor R2 178 in the circuit, and reducing the applied voltage to drive motor 22 to thus reduce the speed of rotation thereof, preferably to a small fraction of the full speed drive i.e., approximately 10% speed. Upon excitation of the photoelectric switch 40b the latching relay CR5 152 is latched to again close contacts at 154, bypassing the resistor R2 178 from the circuit. A diode D4 may be connected across one or more of the relays to shunt transient currents created by rapid opening and closing of the relay, thereby eliminating unwanted triggering of other relays in the manner well known in the art.

Figure 10:
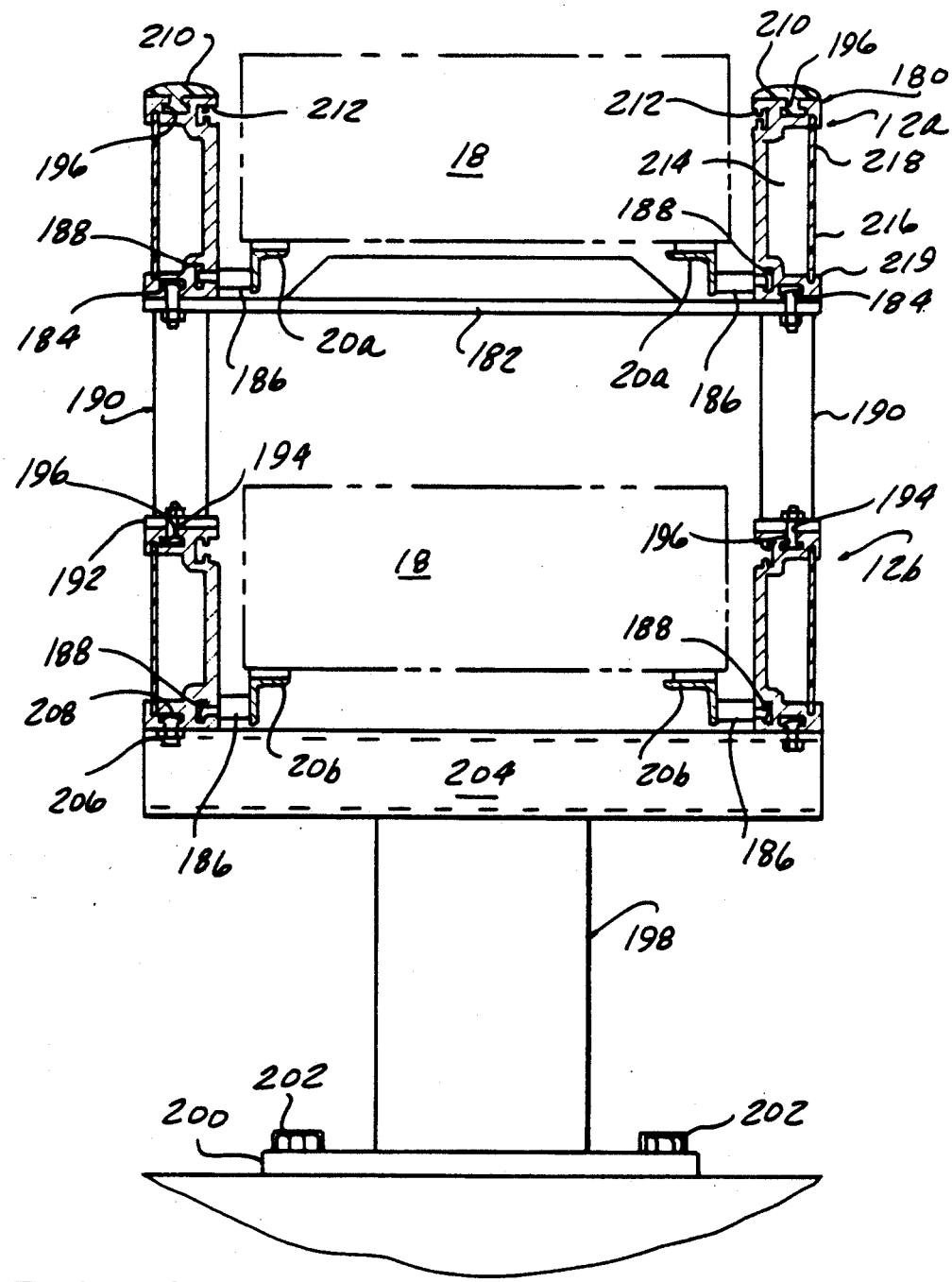
FIG. 10 is a cross sectional view of a two level track incorporated in the conveyor depicted in FIG. 2.

FIG. 10 depicts in cross section the constructional details of the two level track conveyor system of the embodiment of FIG. 2. The conveyor sections 12a and 12b are formed by identical pairs of channel extrusions 180, joined together by means of separate pieces 182 received beneath the lower surface channel 180 secured my means of T-bolts received in T-slots 184. The track sections 20a, 20b are comprised of steel angles mounted on the inside of a respective channel 180 by means of stand offs 186 secured by bolts received in T-slots 188 to correctly position the track sections 20a, 20b in parallel pairs.

Figure 11:
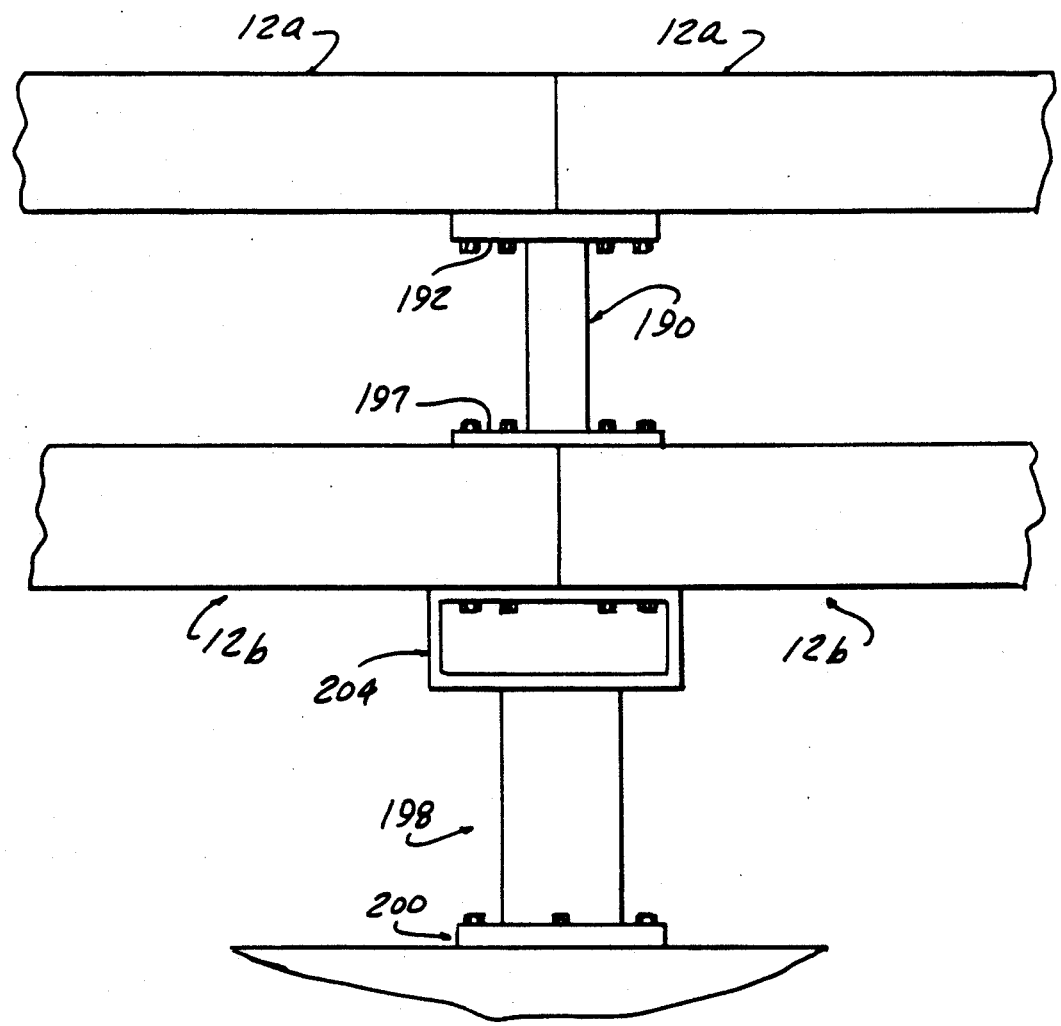
FIG. 11 is a fragmentary side-elevational view of the two level track shown in FIG. 10 illustrating the joinder of adjacent track sections.

FIG. 11 illustrates that vertical I-sections 190 position the conveyor sections 12a and 12b a proper distance apart and also may act to lock together adjacent conveyor sections 12a and 12b by the means of flanges 192 lapping the adjacent sections, with T-bolts 194 received in T-slots 196 in the upper face of the extruded channel 180. Similarly, a support pedestal 198 and flange 200 mount one end of spliced conveyor sections 10, 12 on a floor surface with suitable hold down bolts and leveling screws 202 provided A box beam portion 204 similarly enables splicing together of adjacent lower conveyor sections 12b.

T-bolts 206 received in T-slots 208 provide securement of the under surface of each of the lower channels 180. T-slots 196 of the upper conveyor section 12a may be provided with molded trim strips 210, inserted in the T-slots 196. Each channel 180 is also provided with an upper recess 212 for mounting components on the inside intermediate space such as the conductive bars 34, as will be described below. The channels 180 define cavities 214 which are closed off by suitable plastic cover strips 216 received in upper slot 218 and lower slot 219 formed in the extruded channel 180, with the cavity 214 enabling mounting and protection of the switches, electrical cables, etc. while providing a trim exterior appearance.

FIG. 12 illustrates the engagement position of the contact 108 with one of the conductive bars 34. Each bar 34 is mounted in the recess by means of pedestals 242 received in recesses 212 cammed in the channel 180 located so as to be engaged by a contact 108 as the pallet 18 progresses into registry therewith A pedestal 240 formed at a suitable insulating material such as molded plastic, electrically insulates the same from the channel 180.

FIG. 13 illustrates that each bar 34 is inclined in its forward end such that the contact 108, formed with ramping surfaces 244, is cammed against the bias of compression spring 232 as the pallet 18 progresses along the conveyor 10 such as to be brought into firm contact with the bar 34.

Figure 14:
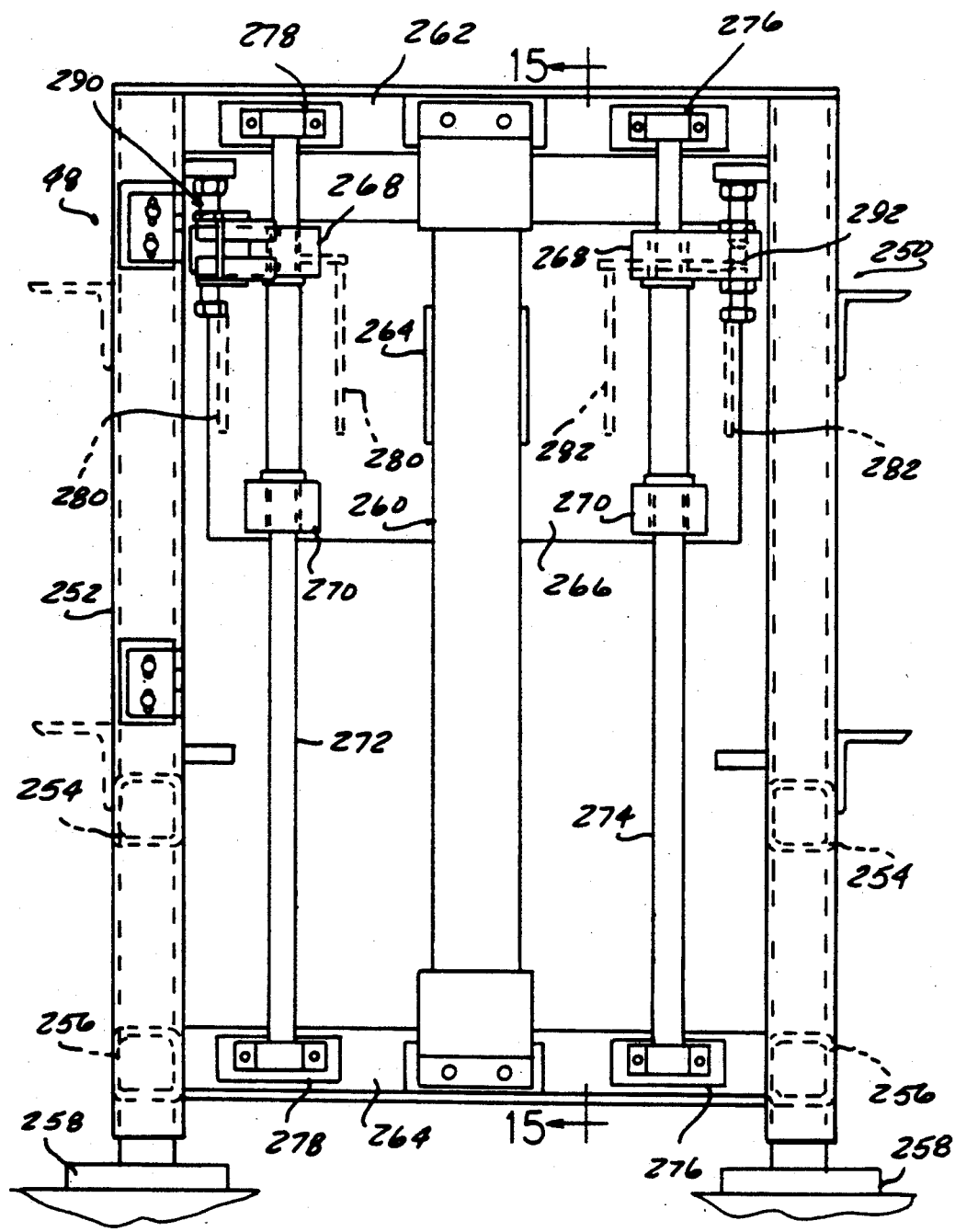
FIG. 14 is a elevational view of a lift-lower mechanism incorporated in the conveyor system depicted in FIG. 2.
Figure 15:
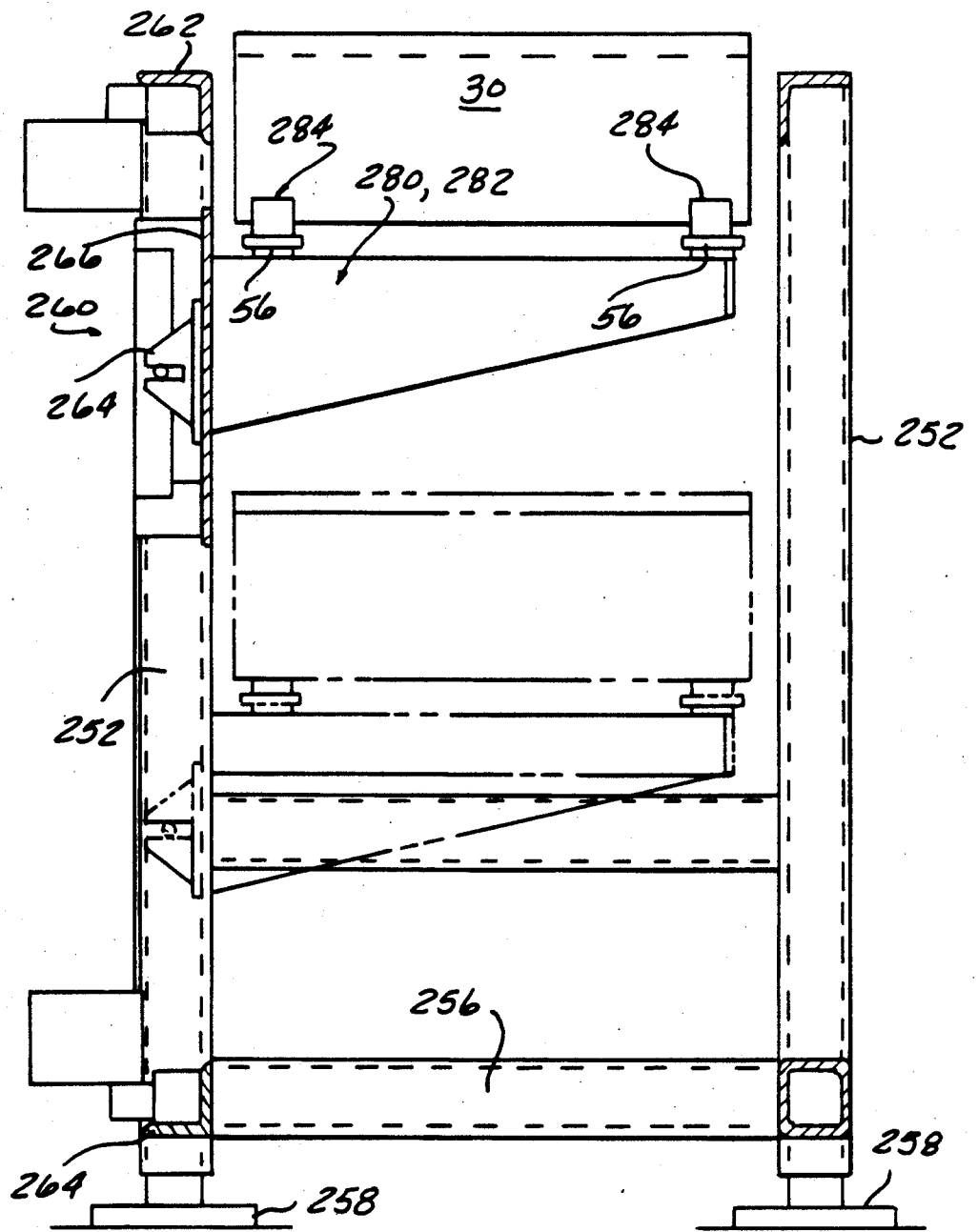
FIG. 15 is a view of the section 15—15 taken in FIG. 14.

FIGS. 14 and 15 illustrate some of the details of a lift-lower mechanisms 48, 50 for incorporation in the embodiment of FIG. 2. The lift-lower mechanisms 48 and 50 include a frame 250 comprised of a weldment of pairs of tubular cross members 252, joined with cross pieces 254 and 256 with bottom pedestals 258 adapted to support the same on a floor surface as illustrated.

A pneumatic actuator cylinder 260 is provided, mounted on upper cross angle piece 262 and lower angle piece 264. Pneumatic cylinder 260 is of the type including an output slider 264 adapted to move up and down located intermediate the length of the cylinder 260. The slider 264 is attached to a plate 266 such as to be reciprocated up and down therewith on shaft bearings 268 and 270, received over respective guide shafts 272 and 274 both mounted vertically at either end to upper cross bar 262 and lower cross bar 264 by mounting assemblies 276 and 278 respectively.

The holder plate 266 supports two auxiliary pairs of gusset plates 280, 282 welded to auxiliary tracks 56 by means of angle pieces 284. Upon actuation to the upper position, the auxiliary tracks 56 are aligned with the upper tracks 20a of the conveyor section 12a, and upon activation of the cylinder 260 so as to lower the support slider 264, support plate 266 and gusset pairs 280 and 282 are moved to a lower position, with auxiliary tracks 56 aligned with lower main track sections 20b.

Proximity switching arrangements 290 and 292 are provided for producing a signal for use in the control system 26 to insure that the elevator slider and attached components 264 have reached either the raised or lowered position.

Figure 17:
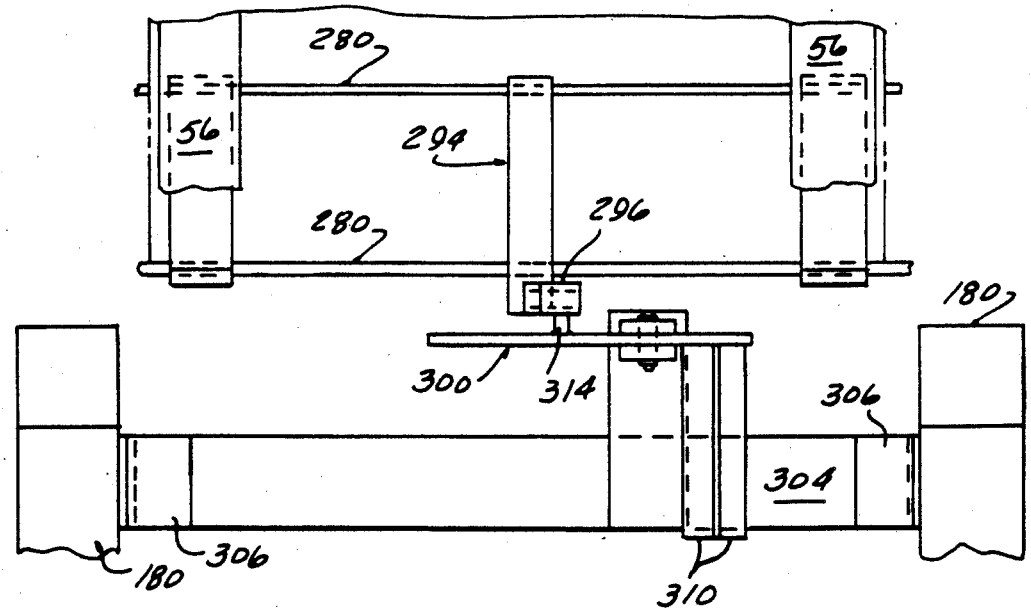
FIG. 17 is a fragmentary sectional view of section 17—17 taken in FIG. 14.
Figure 16:
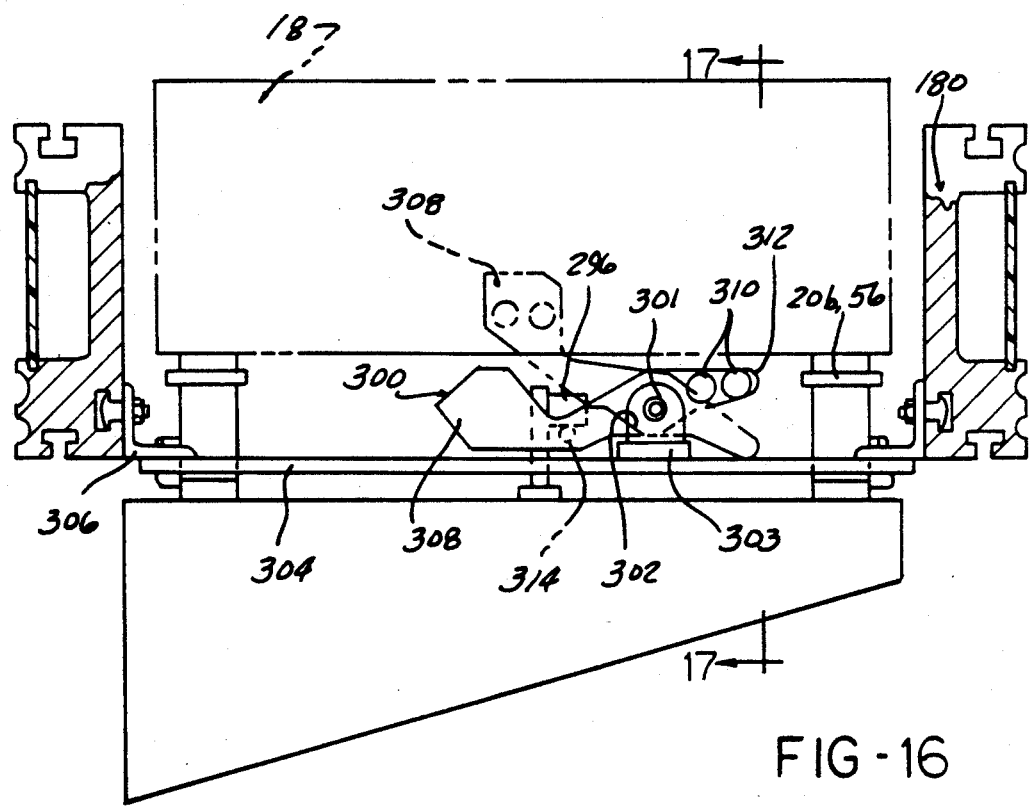
FIG. 16 is a fragmentary view of a portion of the lift and lower mechanism depicting the readiness barrier member movement.
Figure 18:
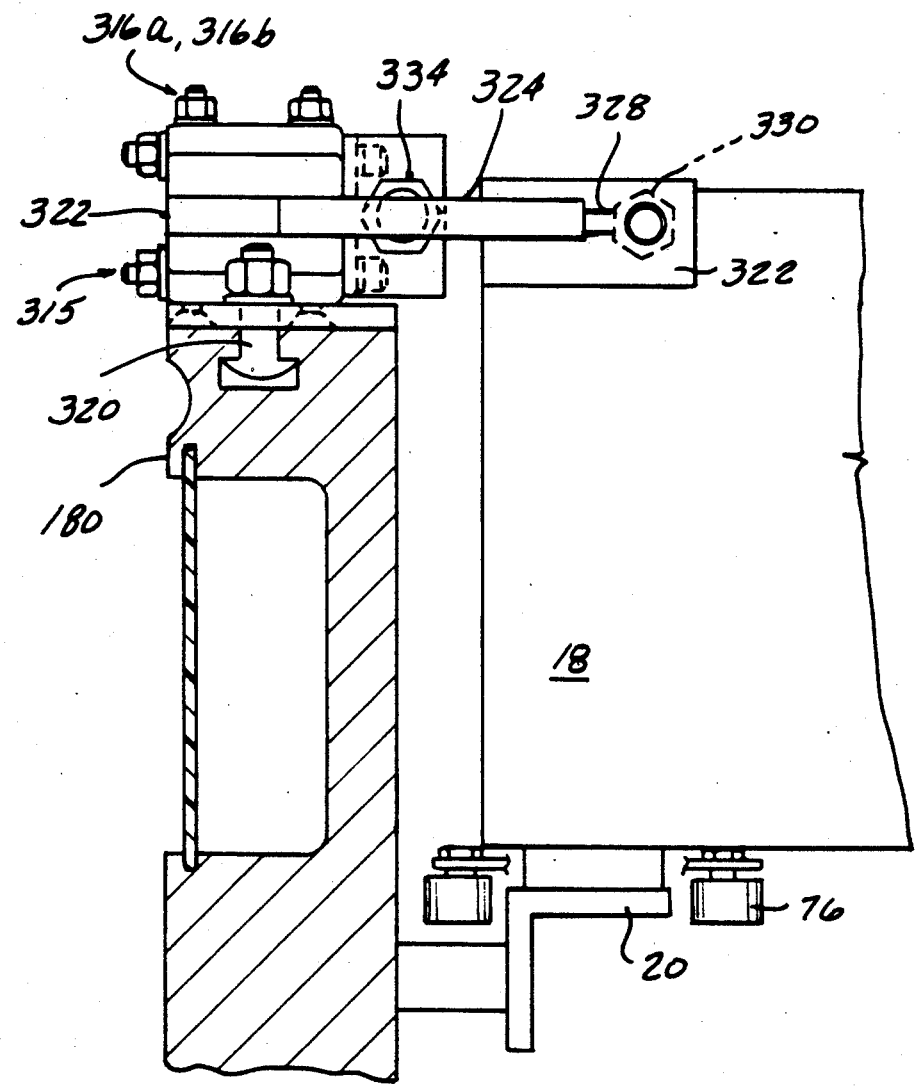
FIG. 18 is a fragmentary elevational view of a locator clamp assembly incorporated at a station in the conveyor system according to the present invention.
Figure 19:
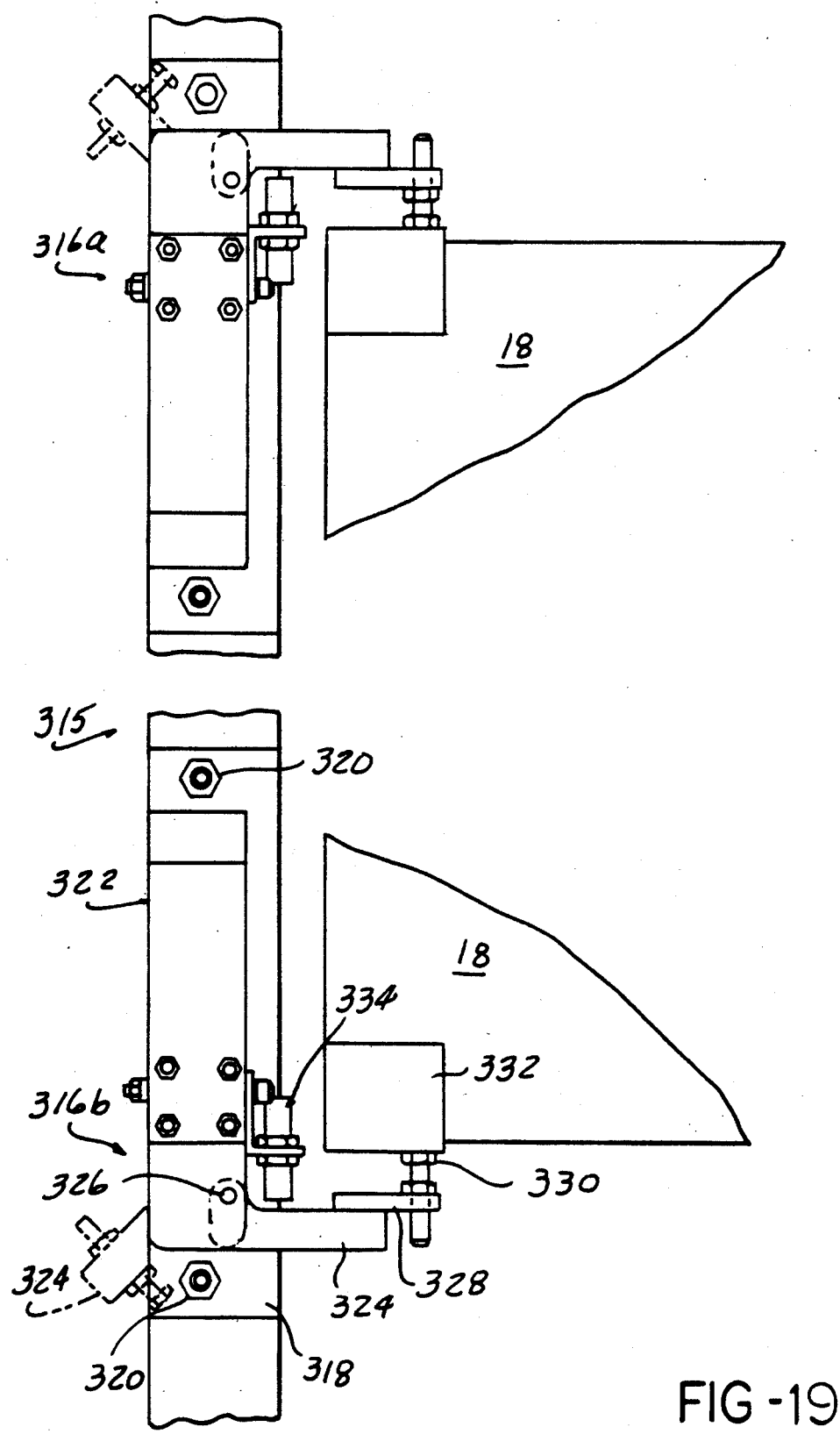
FIG. 19 is a fragmentary plan view of the locator clamp assembly shown in FIG. 18.

FIGS. 16 and 17 illustrate a specific embodiment of the readiness barrier member 28 associated with the elevator mechanism 48 and 50. The gusset pairs 280 and 282 mount an angle bracket 294 having a camming rod 296 affixed thereto. Stop member 28 in this embodiment takes the form of an arm 300 pivotally mounted on a pivot block 302, in turn supported on a cross bar 304 supported on either lower channels 180 by means of angle pieces 306 affixed thereto on the inside surfaces. The paddle portion 308 of the arm 300 is adapted to swing up into the path of a self propelled pallet 18 disposed on lower track 20b. A pair of counter-weighting rods 310 are attached extending from a tail portion 312 of the pivot arm 300. Block 302 being supported on an extension bar 303, such as to position the pivot arm 300 so as to hold an engagement pin 314 beneath the pin 296.

Counterweight rods 310 extend rearwardly such as to overlie the crossbar 304 and act as the stop when the pivot arm 300 is released such as to be rotated upwardly to the position shown in phantom FIG. 13.

The gravity pivoting upwardly of the arm 300 is prevented as long as the pin 296 extends above the restraining pin 314. Upon elevation of the gusset members 280, 282 as described above, the restraining pin 296 is elevated to allow the pivot arm 300 to move to the raised position, with the counterweight rods 310 overlying the crossbar 304 with the paddle portion 308 lying in the path of the next pallet 18 such as to be detected by the pallet by means of the non-contacting switch 24a or 24b. If the switch 24a or 24b fails, the readiness barrier member 26, here comprised of paddle portion 308, will physically restrain the entrance of the pallet 18 onto the auxiliary tracks 56. While the lift-lower mechanism 48 is shown as applied to the lifting end, the lift-lower mechanism 50 is provided at the unload station 16 is similar, but the safety stop is operated by means of a restraining pin being positioned beneath the engagement pin 296 such as to prevent entrance of the next succeeding pallet 18 at the unload station 16.

FIG. 16 shows a more accurate locating-clamping device for providing a relatively precise fore and aft positioning of the pallet 18 on the tracks 20a or 20b.

According to the arrangement shown, precise side to side lateral location of the pallets 18 is achieved by the use of the steel tracks 20a or 20b engaging the guide rollers 71. A reasonably accurate fore and aft positioning is provided by the electrical control of the energization and deenergization of drive motor 22.

In those instances where a greater degree of accuracy is required, a sequenced fore and aft clamping arrangement 315 can achieve a highly accurate positioning of the pallet 18. The arrangement 315 includes a pair of opposing toggle clamp assemblies 316a, 316b mounted to a section of a channel-extrusion 180. Each toggle clamp 316 is of a type commercially available under the trade name BTM Power Clamp PC-1500-V001635 mounted with plate 318 and T-bolts 320. Toggle clamp 316 includes an air cylinder 322 actuating a pivot arm 324 to swing from an angled away position shown in phantom in FIG. 15 to a position extending normally to the channel 180 rotating about a pivot point 326. Attached to the pivot arm 324 is a plate 328 having an adjusting screw assembly 330 positioned to engage locator block 332 carried at one corner of the pallet 18. A proximity detector 334 may also be employed to provide a signal that the particular toggle clamp assembly has been actuated by detecting the position of the arm 324 in the clamped position.

Each toggle clamp assembly 316a, 316b is activated in a staged sequence i.e., the first toggle clamp 316a is activated with arm 324 positioned against locator block 332, and the second toggle clamp assembly 316b thereafter actuated, to force the pallet 18 against the previously extended adjustment nut assembly 330. This provides a precise fore and aft location due to the adjustability of the adjustment nut bolt assembly 330 such that the pallet 18 may be located with the high degree of accuracy necessary for some operations, such as for robot load or unload of workpieces onto and off of the pallet 18.

Figure 20:
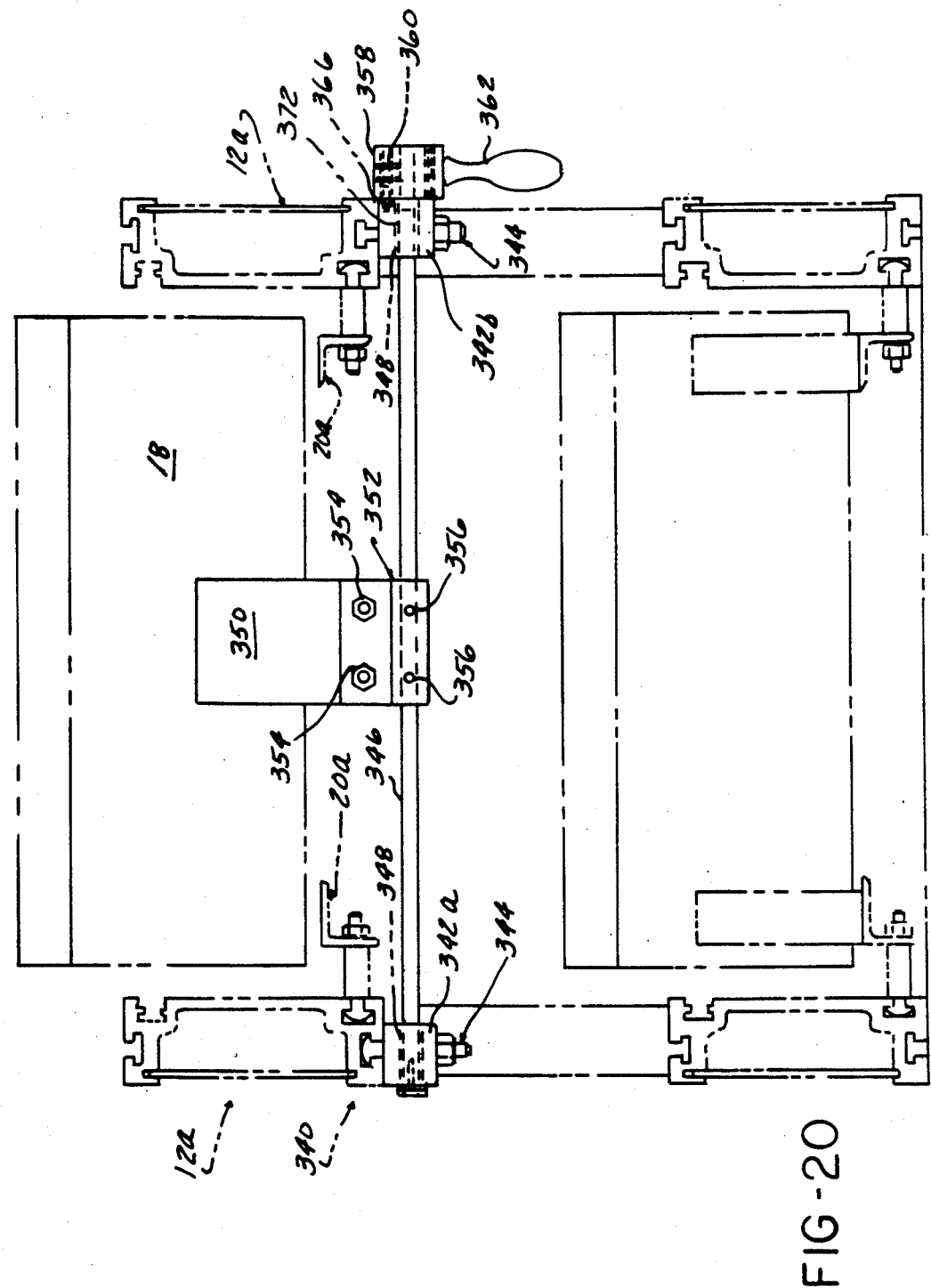
FIG. 20 is a front elevational view of a manually operated movable locator barrier member assembly installed along a conveyor track.

FIG. 20 illustrates a manually operated locator barrier member assembly 340 for selectively stopping a pallet 18 at an intermediate location along the upper track 20a.

The assembly 340 includes bushing blocks 342a and 342b mounted with carriage bolts 344 beneath the upper conveyor section 12a.

A cross shaft 346 is rotatably mounted in bushings 348 disposed within the bushing blocks 342a and 342b, with a paddle plate 350 fixed centrally thereon by means of a collar bracket 352 attached to paddle plate with nut and bolt assemblies 354. Expansion pins 356 key the collar bracket 352 to cross shaft 346.

The right end of the cross shaft 346 protrudes from the right hand bushing block 342b to receive a handle hub 358, fixed thereto with set screw 360. A radially extending handle 362 is fixed to the hub 358 to enable manual tuning of the shaft 346 to move paddle plate 350 up or down, in or out of the path of the pallet 18.

Figure 21:
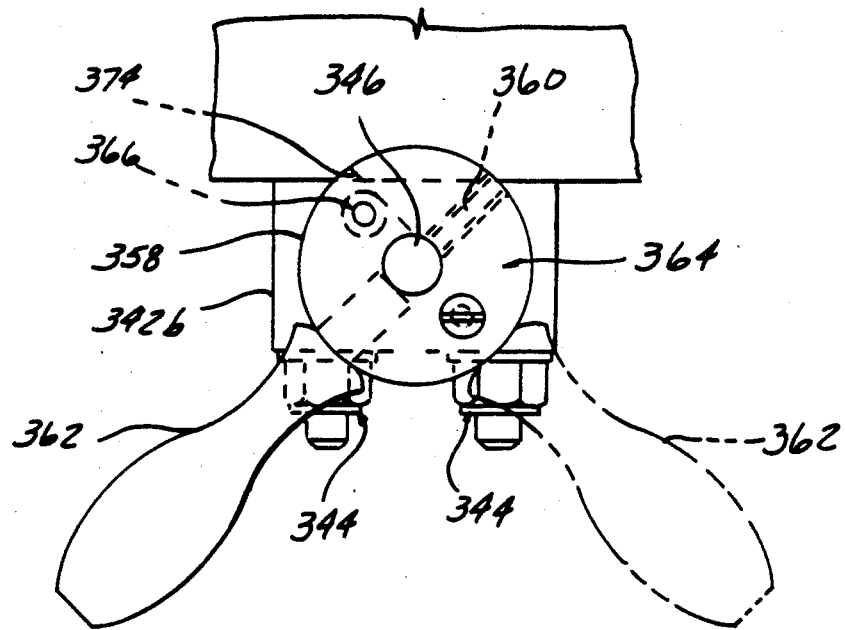
FIG. 21 is an end view of the assembly shown in FIG. 20.

FIG. 21 shows that the handle is movable between paddle raised and lowered positions, with a ball plunger detent 364 and capscrew stop 366 utilized to locate these positions.

Figure 22:
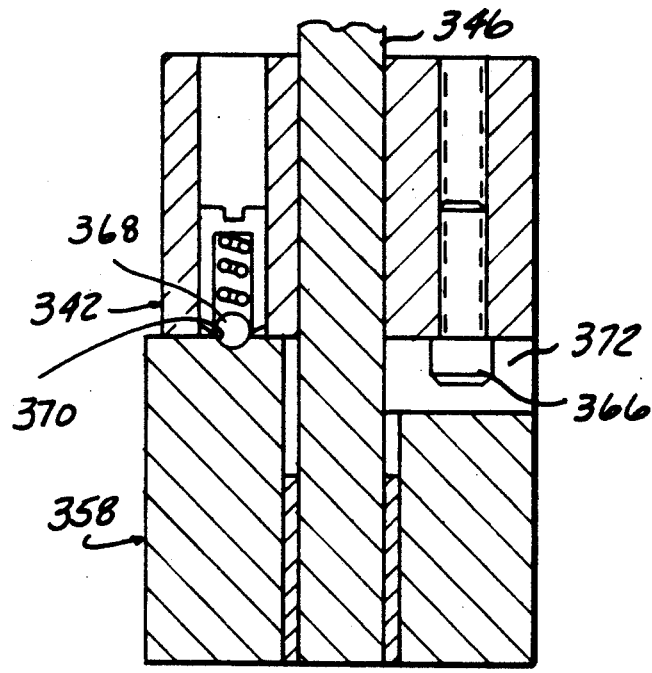
FIG. 22 is a view of the section 22—22 taken in FIG. 21.

FIG. 22 shows the ball 368 seated in a ball seat 370. Capscrew stop 366 moves in a recess 372 defining a locating shoulder 374 against which capscrew stop 366 abuts in the proper position.

This allows manually scheduled inspection, by bringing the paddle plate 350 into position along the path of pallet 18 which is thereby brought to a stop as long as the paddle plate 350 is in such position. The assembly 340 may be located anywhere along the frame 12a.

Accordingly, it can be appreciated that a non-synchronous accumulating conveyor system has been provided which offers the advantage of a having completely standardized components i.e., the curved and straight conveyor sections 12 and pallet cars 18 which may be assembled to provide various configurations or may be rearranged to accommodate new requirements. The components are largely self contained such that a malfunction, for example in an individual pallet 18, will not affect the operation of the system as a whole, and may be lifted off and removed for service or maintenance to thus reduce the incidence of system down time.

A simplified control over the movement of the pallets 18 is also provided by the simple control established by non contacting switches responding to movable barrier members positioned at various points, which movable barriers may also function as a fail safe mechanical stop to minimize accidental damage due to component failure.

The two level track configuration provides a compact arrangement for transferring parts from load and unload stations and other similar applications, while simple controls are afforded by the arrangement of reversible pallet motor and forward and reverse proximity sensors alternately placed in the control circuit.

The simplified queuing arrangement provides the benefits of nonsynchronous accumulating conveyors without the complex mechanically driven custom designed systems required in the prior art accumulating nonsynchronous conveyors.

Each pallet may queue up behind the proceeding pallets and each move up as the leading pallet is accepted into the given station. This can occur in either direction with relatively simple activation of a control circuit.

We claim:

1. An accumulating conveyor (10) including a track (20), one or more stations (14) arranged along said track (20), a plurality of pallets (18) greater in number than said one or more stations (14) whereby said pallets (18) are accumulated upstream from each of said one or more stations (14, 16), an operation performed on each of said workpieces (W) at said one or more stations (14);

each of said plurality of pallets (18) having a propelling drive motor (22), each of said plurality of pallets (18) disposed on said track (30) in a series for self propelled movement along said track (20), said track (20) directing said self propelled pallets (18) into each of said one or more stations (14, 16);

station control means (40a, 40b, 42a, 42b, 24, 30) for causing stopping of each of said pallets (18) in each of said stations (14, 16) by discontinuing propelling drive thereof;

accumulating control means (24, 26) carried by each pallet (18) in which said pallets (20) are able to be queued one behind the other upstream at one or more of said stations (14, 16), said accumulating control means including reflective photoelectric sensor means (24) carried by each pallet (18) sensing the approach of said pallet (18) to the next ahead pallet (18) in said series, by optically detecting an object directly in the path of movement of said pallet at a predetermined substantial distance therefrom; said accumulating control means further including means (26) responsive to said reflective photoelectric sensor means (24) sensing the approach of said pallet (18) to a next ahead pallet (18) but not responsive to the approach of another pallet (18) to the rear, the discontinue the propelling drive of said pallet (18) by said drive motor (22) as said pallet (18) approaches the next ahead pallet (18) so as to stop said pallet (18) in a position spaced behind the next ahead pallet (18), said predetermined substantial distance is greater enough to insure stopping of said pallet (18) with no contact with the next ahead pallet (18) but is small enough to result in closely spaced queued pallets when a series of pallets (18) are stopped, said accumulator control means again causing initiation of propelling drive to each pallet (18) upon movement of the next ahead pallet (18) away therefrom beyond said predetermined substantial distance; said accumulating control means characterized by readiness barrier (28) movably mounted to be selectively positioned upstream of at least one of said stations located at a height to be detected by said photoelectric sensor means to cause stopping of said pallet without a collision therewith, said barrier configured to physically prevent propulsion of a pallet therepast in the event said accumulator control means fails, whereby said pallets (18) may be queued behind each other, closely spaced and upstream of each of said stations (14, 16) behind said readiness barrier and are automatically moved ups step by step as each pallet (18) is propelled into each of said stations (14, 16) after removal of said readiness barrier.

2. The accumulating conveyor (10) according to claim 1 wherein said station control means includes a locator barrier member (30) positionable in said station (14, 16) to properly locate each of said pallets in said station by being detected by said reflective photoelectric sensor means (24) to discontinue propelling said pallet (18) so as to bring said pallet (18) to rest at a predetermined location in said station (14, 16).

3. The accumulating conveyor (10) according to claim 1 including first and second main tracks (20a, 20b) disposed at different vertical levels, one (20a) above the other (20b), and wherein each of said pallets (18) are propelled in opposite directions on respective first and second main tracks (20a, 20b), said electric drive motor (22) on each of said pallets (18) comprising a reversible electric drive motor (22) and including switching means (52, 54) causing said electrical control circuit (26) to power said drive motor (22) so as to propel said pallet (18) in opposite directions on the respective first and second main tracks (20a, 20b).

4. The accumulating conveyor according to claim 3 wherein a pair of reflective photoelectric sensor means (24a, 24b) are provided on each pallet (18), located on either end of said pallet (18), and wherein said electrical control circuit (26) causes deenergization of said drive motor (22) in response to activation of only one or the other of said pair of photoelectric sensors means (24a, 24b), depending on the direction of propulsion of said pallet (18).

5. The accumulating conveyor (10) according to claim 1 further including a battery (32) carried by each pallet (18) connected to said power control circuit (26) and to said electric drive motor (22) on said pallet (18).

6. The accumulating conveyor (10) according to claim 5 further including a pair of charging conductor bars (34) mounted alongside said track (20), immediately upstream of said station (14, 16), and a pair of charging contacts (108) carried by each of said pallets (18) located to move into engagement with a respective charging conductor bar (34), said contacts (108) connected to said battery (32) to enable an electric charging voltage to be applied thereto upon movement of said pallet (18) to a region immediately upstream of said station (14, 16).

7. The accumulating conveyor (10) according to claim 1 wherein said track (20) comprises parallel, spaced, track members and each of said pallets is supported on three rollers (65, 67, 69) two (65, 67) located to ride on one of said track members, the other (69) on the other track member.

8. The accumulating conveyor (10) according to claim 7 further including a plurality of pairs of guiding rollers (74, 76) carried by each pallet (18) engaging the opposite edges of at least one of said track members.

9. The accumulating conveyor (10) according to claim 8 further including a precision locating and clamping mechanism (315) located in said station (14) comprising a pair of oppositely disposed clamping assemblies (316) each adapted to be successively moved to engage each end of a pallet (18) positioned in said station (14) to position said pallet (18) therebetween.

10. The accumulating conveyor (10) according to claim 3 wherein a readiness barrier member (28) is positioned adjacent each of said stations (14, 16) in the path of pallets (18) in each station (14, 16), lift-lower mechanism (48, 50) at each station, each having an auxiliary track 56 positioned to receive and carry each pallet 18 between said first and second main tracks (20a, 20b), and wherein each of said readiness barrier members (28) is moved to block entry of a succeeding pallet (18) whenever said respective auxiliary track (56) is not aligned with respective first or second main track (20a, 20b) on which each of said pallet (18) approaches, whereby propelling of the next succeeding pallet (18) is prevented by operation of said photoelectric sensor means (24) whenever said auxiliary track (56) is not aligned with said one of said track section (20a, 20b).

11. The accumulating conveyor (10) according to claim 10 further including a locator barrier member (30) attached to the advanced end of said auxiliary track (56) whereby a pallet (18) advancing onto said auxiliary track (56) is stopped upon sensing of said locator barrier member (30) to locate said pallet (18) in said station (14, 16) on said lift-lower means (48, 50).

12. The accumulating conveyor (10) according to claim 1 further including a side mounted photoelectric switch (40b) mounted to the side of each pallet (18) connect to said control circuit (26) to cause deenergization of said electric drive motor (22), and also including a photo emitter device (42b) mounted on said conveyor (12) to come into registry with said side mounted photo electric switch (40b), whereby activation of said photo emitter device (42b) causes stoppage of a pallet (18) moving to bring said side mounted photo electric switch (40b) into registry therewith.

13. The accumulating conveyor according to claim 12 further including a second side mounted photoelectric switch (40a) mounted to he side of each of said pallets spaced from said other side mounted photo electric switch (40b), and a second photo emitter device (42a) located to move into registry with said photoelectric switch (40a) as said pallet (18) advances along said track (20), said second photoelectric switch (40a) connected to said control circuit (26) to cause a reduced speed of said electric drive motor (22), whereby activation of said second photo emitter device (42a) and said second photoelectric switch (40a) causes a reduced speed propulsion of the pallet (18).

14. The accumulating conveyor according to claim 10 wherein said switching means comprises a reversing photo emitter device (52a, 52b) mounted at each lift-lower mechanism (48, 50) and also includes a reversing photo electric switch (54a, 54b) mounted to each pallet (18) located to come into registry with each of said reversing photo emitter device (52a, 52b) after said pallet (18) has been moved to another level by each of said lift-lower mechanisms (48, 50), said reversing photo electric switch means (54a, 54b) connected to said control circuit (26) to cause reversing of the electric drive motor (22) upon excitation by either of said photo emitter devices (52a, 52b)

* * * * *

UNITED STATES PATENT AND TRADEMARK OFFICE
CERTIFICATE OF CORRECTION

PATENT NO. : 4,987,834

DATED : January 29, 1991

INVENTOR(S) : Glenn L. Peck, Jr. et al

It is certified that error appears in the above-identified patent and that said Letters Patent is hereby corrected as shown below:

Column 1, line 34, delete "pa".

Column 7, line 50, "hand ling" should be --handling--.
Column 8, line 23, "pal let" should be --pallet--.

Column 11, line 24, "112" should be --110--.
Column 13, line 56, after "therewith" insert --.--.
Column 17, line 12, "greater" should be --great--.
Column 17, line 33, "ups" should be --up--.
Column 18, line 44, "section" should be --sections--.
Column 18, line 55, "connect" should be --connected--.
Column 18, line 65, "he" should be --the--.

Signed and Sealed this

Twelfth Day of October, 1993

Attest:

BRUCE LEHMAN

Attesting Officer

Commissioner of Patents and Trademarks